(12) United States Patent
Ueno et al.

(10) Patent No.: US 7,398,149 B2
(45) Date of Patent: Jul. 8, 2008

(54) CONTROL SYSTEM FOR INTERNAL COMBUSTION ENGINE

(75) Inventors: Masaki Ueno, Wako (JP); Mitsuhiro Iwadare, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 11/526,053

(22) Filed: Sep. 25, 2006

(65) Prior Publication Data

US 2007/0068159 A1 Mar. 29, 2007

(30) Foreign Application Priority Data

Sep. 26, 2005 (JP) ............................. 2005-277085
Mar. 2, 2006 (JP) ............................. 2006-056569

(51) Int. Cl.
F02M 25/07 (2006.01)
F02B 47/08 (2006.01)
F02B 33/44 (2006.01)
F02D 23/00 (2006.01)

(52) U.S. Cl. ........................... 701/108; 60/602; 60/611; 123/568.21

(58) Field of Classification Search ......... 701/101–105, 701/108, 110, 115; 123/568.11, 568.12, 123/568.21, 676, 698; 60/600–603, 605.1, 60/605.2, 609, 611, 612, 378
See application file for complete search history.

(56) References Cited

U.S. PATENT DOCUMENTS

| 5,140,817 | A | * | 8/1992 | Matsuda et al. ............... 60/612 |
|---|---|---|---|---|
| 6,230,697 | B1 | * | 5/2001 | Itoyama et al. .......... 123/568.21 |
| 6,247,311 | B1 | * | 6/2001 | Itoyama et al. ................ 60/602 |
| 6,625,986 | B2 | * | 9/2003 | Mazaud et al. ................ 60/602 |
| 6,729,315 | B2 | * | 5/2004 | Onodera et al. ........ 123/568.21 |
| 6,973,785 | B2 | * | 12/2005 | Umehara et al. ........... 60/605.2 |
| 6,993,901 | B2 | * | 2/2006 | Shirakawa ................... 60/278 |
| 2002/0170291 | A1 | * | 11/2002 | Shirakawa ................... 60/602 |
| 2006/0207252 | A1 | * | 9/2006 | Isobe et al. ................ 60/605.2 |
| 2007/0174003 | A1 | * | 7/2007 | Ueno et al. ................. 701/108 |

FOREIGN PATENT DOCUMENTS

JP 2003-529716 A 10/2003
WO 01/75292 A1 11/2001

* cited by examiner

*Primary Examiner*—Willis R Wolfe, Jr.
(74) *Attorney, Agent, or Firm*—Arent Fox LLP

(57) ABSTRACT

A control system for an internal combustion engine having a compressor wheel and a turbine wheel connected with the compressor wheel and rotationally driven by kinetic energy of exhaust gases from the engine, an exhaust gas flow rate changing device for changing a flow rate of exhaust gases injected to the turbine wheel, an exhaust gas recirculation passage for recirculating the exhaust gases to an intake pipe of the engine, and an exhaust gas recirculation control valve disposed in the exhaust gas recirculation passage. An exhaust pressure is detected, and a value of an intake gas parameter is obtained. A target value of the exhaust pressure and a target value of the intake pipe gas parameter are calculated. A control amount of the exhaust gas flow rate changing device and an opening control amount of the exhaust gas recirculation control valve are calculated using a model predictive control.

33 Claims, 17 Drawing Sheets

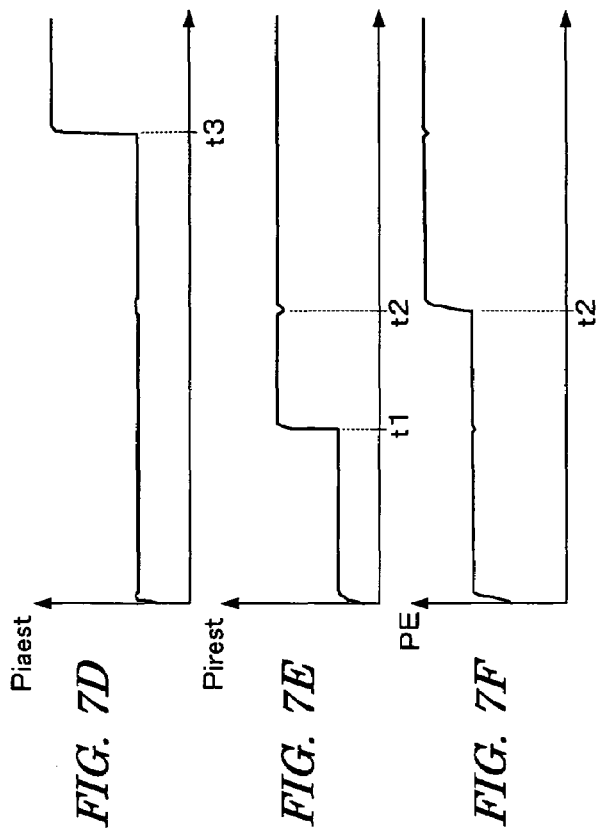
FIG. 7D
FIG. 7E
FIG. 7F
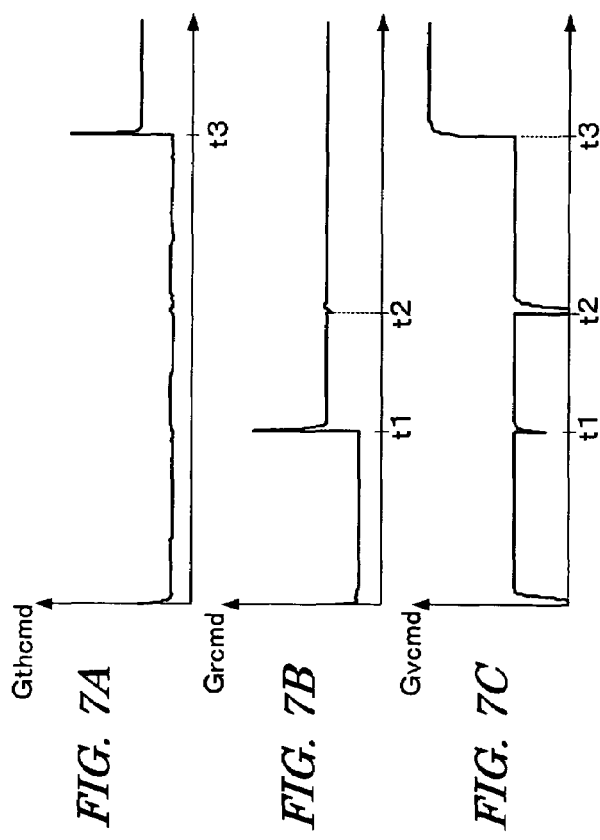
FIG. 7A
FIG. 7B
FIG. 7C

CONTROL SYSTEM FOR INTERNAL COMBUSTION ENGINE

BACKGROUND OF THE INVENTION

1. Field of the Invention

The present invention relates to a control system for an internal combustion engine, and particularly, to a control system for an internal combustion engine having a turbocharger and an exhaust gas recirculation mechanism.

2. Description of the Related Art

A variable displacement turbocharger having a compressor wheel for pressurizing the intake air of an internal combustion engine, a turbine wheel connected to the compressor wheel, and movable vanes for changing a flow rate of exhaust gases that are injected toward the turbine wheel, is widely known. The turbine wheel is rotationally driven by the kinetic energy of the exhaust gases.

An internal combustion engine having an exhaust gas recirculation mechanism for recirculating exhaust gases to the intake system is also widely known and is used to reduce the amount of NOx contained in the exhaust gases. The exhaust gas recirculation mechanism has an exhaust gas recirculation control valve that controls the amount of exhaust gas that is recirculated. A change in the opening of the exhaust gas recirculation control valve affects the pressure supplied to the turbine wheel (exhaust pressure on the upstream side of the turbine wheel) and the boost pressure.

Japanese Patent Laid-open No. JP2003-529716 (JP '716) discloses a control system which controls the opening of the exhaust gas recirculation control valve and the movable vanes of the turbocharger by using a combustion model of the internal combustion engine. According to the control system described by JP '716, a change in the intake air flow rate, which depends on a control amount needed for controlling an opening of the exhaust gas recirculation control valve, is input into a boost pressure control block, whereby an opening of the movable vane is adjusted according to the amount of recirculated exhaust gas.

In the control system disclosed by JP '716, the opening of movable vanes (vane opening) is basically set according to the demand torque of the engine and the engine rotational speed. Also, the set opening is corrected based on a deviation of the actual intake air amount from the demand intake air amount. In the correction control of the vane opening, the change in the intake air flow rate depending on the amount of recirculated exhaust gas is taken into consideration. In other words, according to the control system of JP '716, the parameter indicative of the exhaust condition in the exhaust pipe is not used for controlling the vane opening. Instead, the vane opening is merely limited by a limiter. Therefore, there remains a need for improvement in controlling the exhaust pressure, the boost pressure, and the recirculation amount of exhaust gases that are relevant to each other.

SUMMARY OF THE INVENTION

The present invention was attained contemplating the above-described needs. A first aspect of the present invention is to provide a control system for an internal combustion engine which appropriately controls the exhaust gas recirculation control valve and the turbocharger to completely and precisely perform a flow rate control of intake gases (fresh air and recirculated exhaust gases) of the internal combustion engine in order to obtain maximum engine performance.

A second aspect of the present invention is to provide a control system for an internal combustion engine having a throttle valve which appropriately controls the throttle as well as the exhaust gas recirculation control valve and the turbocharger to completely and precisely perform a flow rate control of intake gases (fresh air and recirculated exhaust gases) of the internal combustion engine in order to obtain maximum engine performance.

To attain the first aspect, the present invention includes a control system for an internal combustion engine having a turbocharger with a compressor wheel that pressurizes the intake air of the engine and a turbine wheel connected to the compressor wheel which is rotationally driven by the kinetic energy of the exhaust gas from the engine. An exhaust gas flow rate changing means changes a flow rate of the exhaust gas injected into the turbine wheel. An exhaust gas recirculation passage recirculates the exhaust gas into an intake pipe of the engine with an exhaust gas recirculation control valve disposed in the exhaust gas recirculation passage. The control system includes exhaust pressure detecting means, intake pipe gas parameter obtaining means, first target value calculating means, second target value calculating means, and gas control means. The exhaust pressure detecting means detects an exhaust pressure (PE) in an exhaust pipe of the engine. The intake pipe gas parameter obtaining means detects or estimates a value of an intake pipe gas parameter (Pirest, Pioest) which is indicative of a state of gases in the intake pipe. The first target value calculating means calculates a target value (Peref) of the exhaust pressure (PE). The second target value calculating means calculates a target value (Piaref) of the intake pipe gas parameter (Piaest). The gas control means calculates a control amount ($\theta$vcmd) of the exhaust gas flow rate changing means and an opening control amount ($\theta$rcmd) of the exhaust gas recirculation control valve using a model predictive control, so that values of the detected exhaust pressure (PE) and the intake pipe gas parameter (Pirest, Pioest), respectively, coincide with the target values (Peref, Pirref, Pioref) of the exhaust pressure and the intake pipe gas parameter.

With the above-described structural configuration, the exhaust pressure value, which is indicative of the state of gases in the exhaust pipe of the engine, is detected; the value of the intake pipe gas parameter, which is indicative of the state of gases in the intake pipe, is detected or estimated; and the target values of the exhaust pressure and the intake pipe gas parameter are calculated. The control amount of the exhaust gas flow rate changing means and the opening control amount of the exhaust gas recirculation control valve are calculated using the model predictive control so that the detected exhaust pressure and the detected or estimated intake pipe gas parameter value coincide, respectively, with the corresponding target values. Therefore, the model predictive control, which makes both of the exhaust pressure value and the intake pipe gas parameter value coincide with the corresponding target values, is performed, thereby optimally controlling the state of the gases supplied to the engine as well as maintaining the optimal state of exhaust gases.

By using the model predictive control, a plurality of outputs of the controlled object having a plurality of inputs and outputs, i.e., the exhaust pressure and the intake pipe gas parameter value, can be made to converge to the corresponding target values simultaneously and at the same speed. Consequently, the flow rate control of gases (the fresh air and the recirculated exhaust gases) supplied to the engine can be performed completely or totally and precisely, thereby obtaining maximum engine performance. Further, if the controlled object model can be defined by equations, the control system performing the model predictive control can easily be configured. Therefore, the control system can easily be applied to various hardware configurations. In other words, the control system has an advantage of high flexibility, and the manpower required for setting maps that are essential for the control is greatly reduced.

Preferably, the exhaust pressure is a pressure (PE) on the upstream side of the turbine wheel in the exhaust pipe. The intake pipe gas parameter is a partial pressure (Pia, Pir) of fresh air or the recirculated exhaust gases on the downstream side of the compressor wheel in the intake pipe, or a flow rate (Gia, Gir) of the fresh air or the recirculated exhaust gases flowing in the intake pipe.

With the above-described structural configuration, the partial pressure of fresh air or the recirculated exhaust gases on the downstream side of the compressor wheel in the intake pipe or the flow rate of fresh air or the recirculated exhaust gases flowing in the intake pipe can optimally be controlled while maintaining an optimal exhaust pressure on the upstream side of the turbine wheel in the exhaust pipe.

Alternatively, the exhaust pressure is a pressure (PE) on the upstream side of the turbine wheel in the exhaust pipe. The intake pipe gas parameter is a partial pressure (Pio, Pii) of oxygen or inert gases on the downstream side of the compressor wheel in the intake pipe, or a flow rate (Gio, Gii) of the oxygen or the inert gases flowing in the intake pipe. The inert gases are gases in the intake pipe other than oxygen.

With the above-described structural configuration, the partial pressure of oxygen or inert gases on the downstream side of the compressor wheel in the intake pipe or the flow rate of oxygen or inert gases flowing in the intake pipe can optimally be controlled while maintaining the optimal exhaust pressure on the upstream side of the turbine wheel in the exhaust pipe.

To attain the second aspect, the present invention includes a control system for an internal combustion engine having a turbocharger with a compressor wheel that pressurizes the intake air of the engine and a turbine wheel connected to the compressor wheel which is rotationally driven by the kinetic energy of exhaust gas from the engine. An exhaust gas flow rate changing means changes a flow rate of the exhaust gas injected into the turbine wheel. An exhaust gas recirculation passage recirculates the exhaust gas into an intake pipe of the engine. An exhaust gas recirculation control valve is disposed in the exhaust gas recirculation passage, and a throttle valve is disposed in the intake pipe. The control system includes exhaust pressure detecting means, intake pipe gas parameter obtaining means, first target value calculating means, second target value calculating means, and gas control means. The exhaust pressure detecting means detects an exhaust pressure (PE) in an exhaust pipe of the engine. The intake pipe gas parameter obtaining means detects or estimates values of intake pipe gas parameters (Piaest, Pirest, PI, Pioest) which are indicative of a state of the gases in the intake pipe. The first target value calculating means calculates a target value (Peref) of the exhaust pressure (PE). The second target value calculating means calculates target values (Piaref, Pirref, Piref, Pioref) of the intake pipe gas parameters. The gas control means calculates a control amount ($\theta$vcmd) of the exhaust gas flow rate changing means, an opening control amount ($\theta$rcmd) of the exhaust gas recirculation control valve, and an opening control amount ($\theta$thcmd) of the throttle valve using a model predictive control, wherein values of the detected exhaust pressure (PE) and the intake pipe gas parameters (Piaest, Pirest, PI, Pioest), respectively, coincide with the target values (Peref, Piaref, Pirref, Piref, Pioref) of the exhaust pressure and the intake pipe gas parameters.

With the above-described structural configuration, the exhaust pressure value, which is indicative of the state of gases in the exhaust pipe of the engine, is detected; the values of the intake pipe gas parameters, which are indicative of the state of gases in the intake pipe, are detected or estimated; and the target values of the exhaust pressure and the intake pipe gas parameters are calculated. The control amount of the exhaust gas flow rate changing means, the opening control amount of the exhaust gas recirculation control valve, and the opening control amount of the throttle valve are calculated using the model predictive control so that the detected exhaust pressure and the detected or estimated intake pipe gas parameter values coincide, respectively, with the corresponding target values. Therefore, the model predictive control, which makes all of the exhaust pressure values and the intake pipe gas parameter values coincide with the corresponding target values, is performed for the engine having a throttle valve in the intake pipe, thereby optimally controlling the state of gases supplied to the engine as well as maintaining the optimal state of exhaust gases.

Preferably, the exhaust pressure is a pressure (PE) on the upstream side of the turbine wheel in the exhaust pipe. The intake pipe gas parameters are any two of a partial pressure (Pia) of fresh air on the downstream side of the throttle valve in the intake pipe, a partial pressure (Pir) of the recirculated exhaust gases on the downstream side of the throttle valve in the intake pipe, and a sum (Pi) of the partial pressures of the fresh air and the recirculated exhaust gases, or any two of a flow rate (Gia) of the fresh air flowing in the intake pipe, a flow rate (Gir) of the recirculated exhaust gases flowing in the intake pipe, and a sum (Gia+Gir) of the flow rates of the fresh air and the recirculated exhaust gases.

With the above-described structural configuration, any two of the partial pressure of fresh air on the downstream side of the throttle valve in the intake pipe, the partial pressure of the recirculated exhaust gases on the downstream side of the throttle valve in the intake pipe, and the sum of the partial pressures of the fresh air and the recirculated exhaust gases, or any two of the flow rate of the fresh air flowing in the intake pipe, the flow rate of the recirculated exhaust gases flowing in the intake pipe, and the sum of the flow rates of the fresh air and the recirculated exhaust gases can optimally be controlled while maintaining the optimal exhaust pressure on the upstream side of the turbine wheel in the exhaust pipe.

Alternatively, the exhaust pressure is a pressure (PE) on the upstream side of the turbine wheel in the exhaust pipe. The intake pipe gas parameters are any two of a partial pressure (Pio) of oxygen on the downstream side of the throttle valve in the intake pipe, a partial pressure (Pii) of inert gases on the downstream side of the throttle valve in the intake pipe, and a sum (Pi) of the partial pressures of the oxygen and the inert gases, or any two of a flow rate (Gio) of the oxygen flowing in the intake pipe, a flow rate (Gii) of the inert gases flowing in the intake pipe, and a sum (Gio+Gii) of the flow rates of the oxygen and the inert gases.

With the above-described structural configuration, any two of the partial pressure of oxygen on the downstream side of the throttle valve in the intake pipe, the partial pressure of inert gases on the downstream side of the throttle valve in the intake pipe, and the sum of the partial pressures of the oxygen and the inert gases, or any two of the flow rate of the oxygen flowing in the intake pipe, the flow rate of the inert gases flowing in the intake pipe, and the sum of the flow rates of the oxygen and the inert gases can optimally be controlled while maintaining the optimal exhaust pressure on the upstream side of the turbine wheel in the exhaust pipe.

Preferably, the control system further includes boost pressure detecting means for detecting a boost pressure (PB) in the intake pipe, wherein the second target value calculating means includes steady state target value calculating means for calculating a steady state target value (Pides) corresponding to a steady state of the engine according to the operating condition of the engine and modifying means for modifying the steady state target value (Pides) according to the detected boost pressure (PB) in order to calculate at least one target value (Piaref, Pirref, Piref, Pioref) of the intake pipe gas parameter.

With the above-described configuration, the steady state target value, which corresponds to the steady state of the engine, is calculated according to the operating condition of the engine, and the steady state target value is modified according to the detected boost pressure in order to calculate at least one target value of the intake gas parameter. The target value(s) is(are) prevented from being set to a value that is impossible to control due to a delay of change in the boost pressure. Consequently, the intake pipe gas parameter(s) can smoothly be controlled to the target value(s).

Preferably, the control system further includes boost pressure detecting means for detecting a boost pressure (PB) in the intake pipe and intake air flow rate detecting means for detecting a flow rate (GA) of fresh air flowing in the intake pipe, wherein the first target value calculating means includes target power value calculating means for calculating a target power value (Wcref) of the compressor wheel according to a target boost pressure (Pides) and a target fresh air flow rate (Giades) that are calculated according to the operating condition of the engine, estimated power value calculating means for calculating an estimated power value (Wcest) of the compressor wheel according to the detected boost pressure (PB) and the detected fresh air flow rate (GA), and feedback calculating means for calculating the target value (Peref of the exhaust pressure so that the estimated power value (Wcest) coincides with the target power value (Wcref).

With the above-described structural configuration, the target power value of the compressor wheel is calculated according to the target boost pressure, the target fresh air flow rate is calculated according to the operating condition of the engine, and the estimated power value of the compressor wheel is calculated according to the detected boost pressure and the detected fresh air flow rate. Further, the target value of the exhaust pressure is calculated so that the estimated power value coincides with the target power value. The control amount of the exhaust gas flow rate changing means and the opening control amount of the exhaust gas recirculation control valve (and the opening control amount of the throttle valve) are calculated so that the detected exhaust pressure coincides with the calculated target value. In other words, the cascade control, wherein the master feedback control is performed during calculation of the target value of the exhaust pressure, and the slave feedback control which is performed during calculation of the control amounts of the actuators (the exhaust gas flow rate changing means, the exhaust gas recirculation control valve, the throttle valve) are performed. Therefore, control performance of the boost pressure control, which has a relatively low or slow response speed, is improved.

Preferably, a controlled object model used in the model predictive control is defined using, as control inputs, a mass flow rate (Gvcmd) of gases passing through the exhaust gas flow rate changing means, a mass flow rate (Grcmd) of gases passing through the exhaust gas recirculation control valve, and a mass flow rate (Gthcmd) of fresh air passing through the throttle valve.

With the above-described structural configuration, the controlled object model is defined using, as control inputs, the mass flow rate of gases passing through the exhaust gas flow rate changing means, the mass flow rate of gases passing through the exhaust gas recirculation control valve, and the mass flow rate of fresh air passing through the throttle valve. Therefore, the equations defining the controlled object model can be simplified to reduce a calculation load on the control processing unit compared to the control amounts of the flow rate control mechanisms, such as the exhaust gas flow rate changing means and the exhaust gas recirculation control valve, being used as the control inputs.

Further, when there is a change in the flow rate characteristic of the exhaust gas flow rate changing means, the exhaust gas recirculation control valve, or the throttle valve, only a change in the conversion characteristic for converting the flow rate to the valve opening is necessary, and no change in the control logic of the gas control means that performs the model predictive control is necessary. Further, by adding a local feedback control wherein the valve opening of the exhaust gas flow rate changing means, the exhaust gas recirculation control valve, or the throttle valve is controlled in a feedback manner, control performance against disturbance to the valve opening is improved. This is an effect of the cascade control, and the effect becomes more significant when the response speed of the actual valve opening to the valve opening command value is sufficiently fast (compared with the behavior of intake gases and exhaust gases that are the controlled object of the gas control means).

The above-described aspects, other aspects, characteristics, and advantages of the present invention will become apparent from the preferred embodiments which will be described in detail below with reference to the attached drawings.

BRIEF DESCRIPTION OF THE DRAWINGS

FIGS. 7A-7F are time charts illustrating an example of a control operation;

DETAILED DESCRIPTION OF THE PREFERRED EMBODIMENTS

Preferred embodiments of the present invention are described below with reference to the attached drawings.

Figure 1:
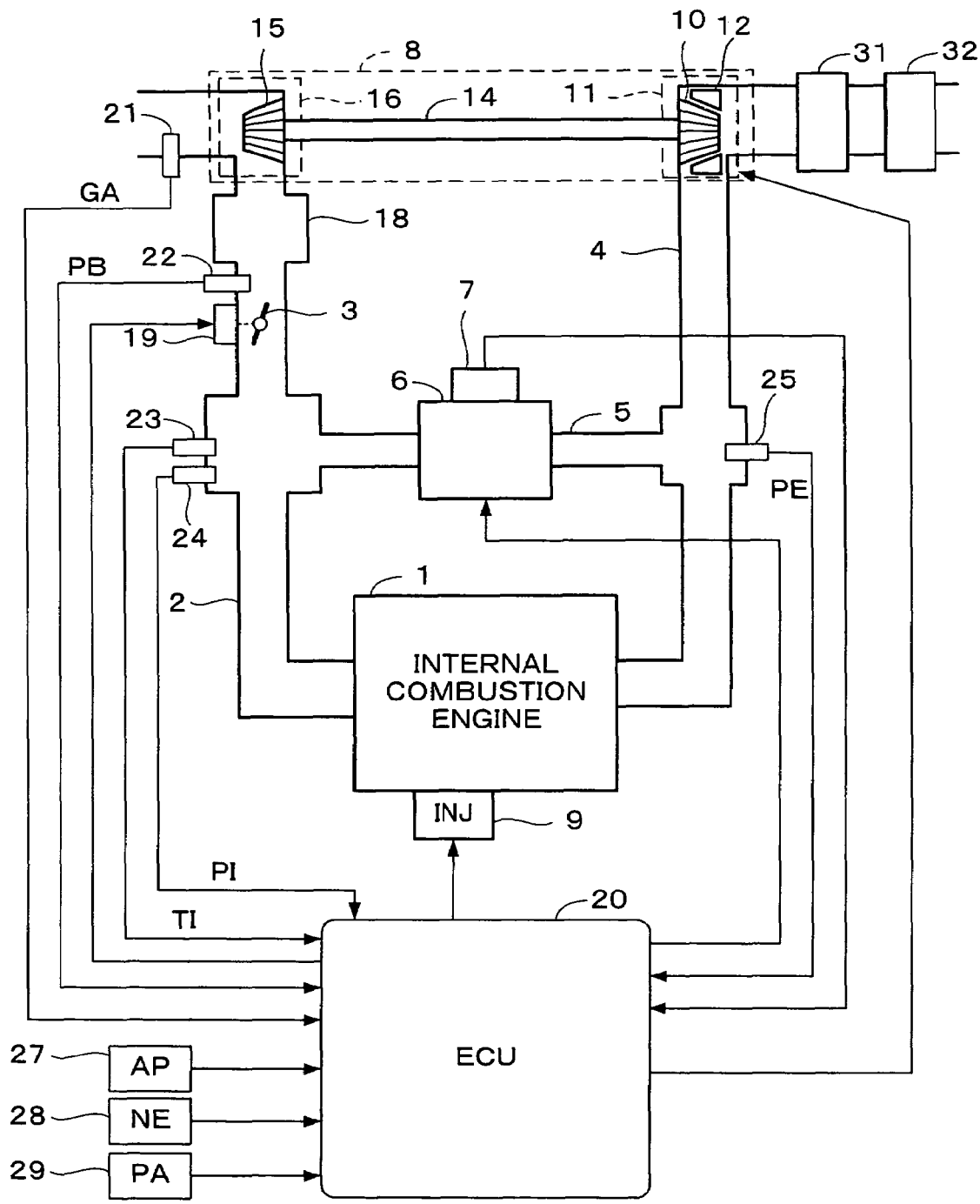
FIG. 1 is a schematic diagram illustrating a configuration of the internal combustion engine and a control system therefor according to a first embodiment of the present invention.

FIG. 1 is a schematic diagram illustrating a configuration of an internal combustion engine and a control system therefor according to a first embodiment of the present invention. The internal combustion engine 1 (hereinafter referred to as "engine") is a diesel engine wherein fuel is injected directly into the cylinders. Each cylinder is provided with a fuel injection valve 9 that is electrically connected to an electronic control unit (hereinafter referred to as "ECU 20"). The ECU 20 controls a valve opening period of each fuel injection valve 9.

The engine 1 has an intake pipe 2, an exhaust pipe 4, and a turbocharger 8. The turbocharger 8 includes a turbine 11 and a compressor 16. The turbine 11 has a turbine wheel 10 rotationally driven by the kinetic energy of exhaust gases. The compressor 16 has a compressor wheel 15 connected to the turbine wheel 10 via a shaft 14. The compressor wheel 15 pressurizes (compresses) the intake air of the engine 1.

The turbine 11 has a plurality of movable vanes 12 and an actuator (not shown) for actuating the movable vanes 12 to open and close. The plurality of movable vanes 12 are actuated to open and close in order to change a flow rate of exhaust gases that are injected to the turbine wheel 10. The turbine 11 is configured so that the flow rate of exhaust gases injected to the turbine wheel 10 is changed by changing an opening of the movable vane 12 (hereinafter referred to as "vane opening") VO, to change the rotational speed of the turbine wheel 10. The actuator, which actuates the movable vanes 12, is connected to the ECU 20, and the vane opening VO is controlled by the ECU 20. Specifically, the ECU 20 supplies a control signal of a variable duty ratio to the actuator and controls the vane opening VO by the control signal. The configuration of the turbocharger having movable vanes is widely known and is disclosed, for example, in Japanese Patent Laid-open No. H01-208501.

The intake pipe 2 is provided with an intercooler 18 downstream of the compressor 16, and a throttle valve 3 downstream of the intercooler 18. The throttle valve 3 is configured to be actuated to open and close by an actuator 19 that is connected to the ECU 20. The ECU 20 performs an opening control of the throttle valve 3 through the actuator 19.

An exhaust gas recirculation passage 5 for recirculating exhaust gases to the intake pipe 2 is provided between the exhaust pipe 4 and the intake pipe 2. The exhaust gas recirculation passage 5 is provided with an exhaust gas recirculation control valve 6 (hereinafter referred to as "EGR valve") that controls the amount of recirculated exhaust gases. The EGR valve 6 is an electromagnetic valve having a solenoid. A valve opening of the EGR valve 6 is controlled by the ECU 20. The EGR valve 6 is provided with a lift sensor 7 for detecting a valve opening (a valve lift amount) LACT, and the detection signal is supplied to the ECU 20. The exhaust gas recirculation passage 5 and the EGR valve 6 define an exhaust gas recirculation mechanism.

An intake air flow rate sensor 21, a boost pressure sensor 22, an intake air temperature sensor 23, and an intake pressure sensor 24 are disposed in the intake pipe 2. The intake air flow rate sensor 21 detects an intake air flow rate GA. The boost pressure sensor 22 detects an intake pressure (boost pressure) PB at a portion of the intake pipe 2 downstream of the compressor 16. The intake air temperature sensor 23 detects an intake air temperature TI. The intake air pressure sensor 24 detects an intake pressure PI on the downstream side of the throttle valve 3 in the intake pipe 2. Further, an exhaust pressure sensor 25 is disposed in the exhaust pipe 4. The exhaust pressure sensor 25 detects an exhaust pressure PE at a portion of the exhaust pipe 4 upstream of the turbine 11. The sensors 21 to 25 are connected to the ECU 20, and the detection signals from the sensors 21 to 25 are supplied to the ECU 20.

A catalytic converter 31 and a particulate filter 32 are disposed downstream of the turbine 11 in the exhaust pipe 4. The catalytic converter 31 accelerates oxidation of hydrocarbon and CO in the exhaust gases. The particulate filter 32 traps particulate matter which mainly consists of soot.

An accelerator sensor 27, an engine rotational speed sensor 28, and an atmospheric pressure sensor 29 are connected to the ECU 20. The accelerator sensor 27 detects an operation amount AP of the accelerator (not shown) of the vehicle driven by the engine 1 (hereinafter referred to as "the accelerator pedal operation amount AP"). The engine rotational speed sensor 28 detects an engine rotational speed NE. The atmospheric pressure sensor 29 detects an atmospheric pressure PA. The detection signals of the sensors 27 to 29 are supplied to the ECU 20.

The ECU 20 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital values. The memory circuit preliminarily stores various operating programs to be executed by the CPU and stores the results of computations, or the like, by the CPU. The output circuit supplies control signals to the actuator for actuating the movable vanes 12 of the turbine 11, the fuel injection valves 9, the EGR valve 6, the actuator for actuating the throttle valve 3, and the like.

The ECU 20 performs an intake and exhaust gas state control in which an intake gas state and an exhaust gas state of the engine 1 are controlled using the model predictive control. Specifically, the ECU 20 controls a vane opening VO, a throttle opening TH, and a lift amount (opening) LACT of the EGR valve 6 so that a partial pressure of fresh air in the intake pipe 2, a partial pressure of recirculated exhaust gases, and an exhaust pressure coincide with corresponding target values. The partial pressures of fresh air and recirculated gases in the intake pipe 2 are pressures on the downstream side of the throttlve valve 3.

Figure 2:
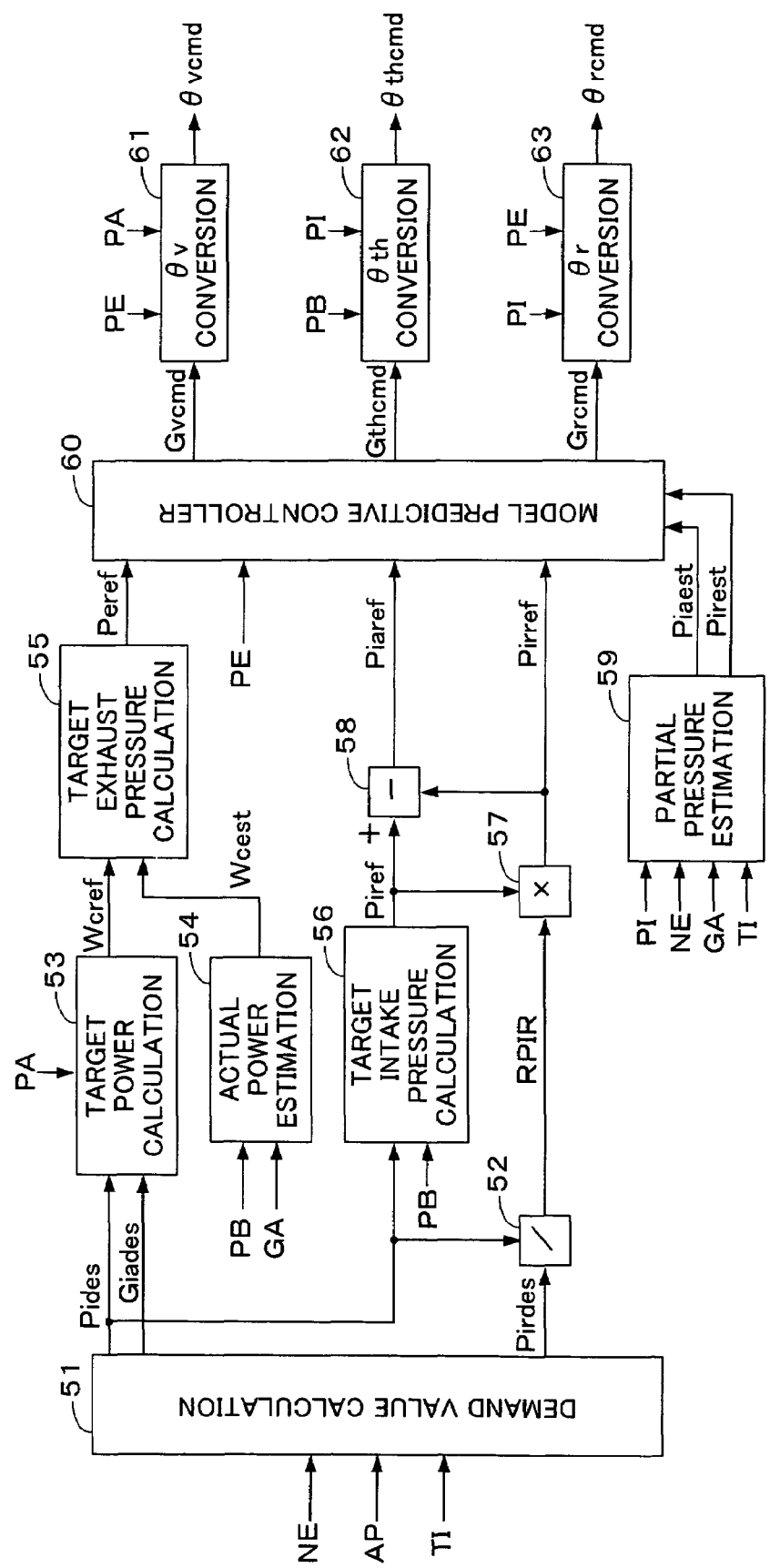
FIG. 2 is a block diagram illustrating a configuration of a module which performs an intake and exhaust gas state control of the internal combustion engine shown in FIG. 1.

FIG. 2 is a block diagram showing a configuration of a module which performs the intake and exhaust gas state control. The function of each block shown in FIG. 2 is actually realized by the operation process executed by the CPU in the ECU 20.

The intake and exhaust gas state control module shown in FIG. 2 includes a demand value calculation block 51, a target power calculation block 53, an actual power estimation block 54, a target exhaust pressure calculation block 55, a dividing block 52, a target intake pressure calculation block 56, a multiplying block 57, a subtracting block 58, a partial pressure estimation block 59, a model predictive controller 60, a θv conversion block 61, a θth conversion block 62, and a θr conversion block 63. The functions of the functional blocks are described below.

Figure 3:
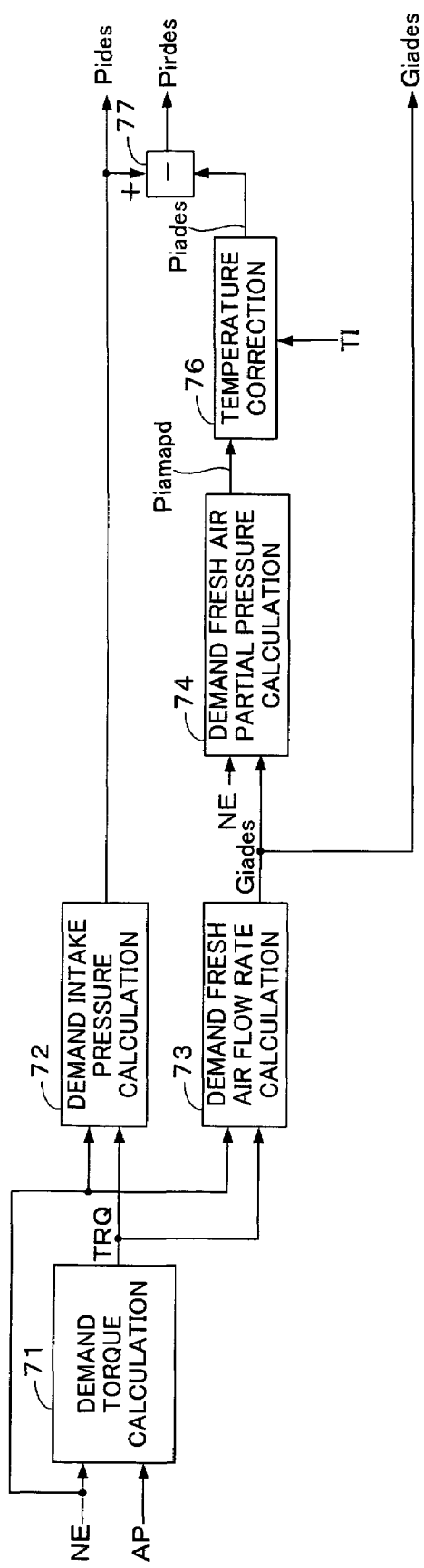
FIG. 3 is a block diagram illustrating a configuration of a demand value calculation block shown in FIG. 2.

The demand value calculation block 51 includes, as shown in FIG. 3, a demand torque calculation block 71, a demand intake pressure calculation block 72, a demand fresh air flow rate calculation block 73, a demand fresh air partial pressure calculation block 74, a temperature correction block 76, and a subtracting block 77. The demand torque calculation block 71 calculates a demand torque TRQ of the engine 1 according to the engine rotational speed NE and the accelerator pedal operation amount AP. The demand torque TRQ is set to increase as the accelerator pedal operation amount AP increases.

The demand intake pressure calculation block 72 calculates a demand intake pressure Pides according to the engine rotational speed NE and the demand torque TRQ. The demand intake pressure Pides, which is a steady state target value corresponding to a steady state of the engine 1, is set to become higher as the demand torque TRQ increases. The demand fresh air flow rate calculation block 73 calculates a demand fresh air flow rate Giades according to the engine rotational speed NE and the demand torque TRQ. The demand fresh air flow rate Giades is set to increase as the engine rotational speed NE increases or the demand torque TRQ increases. The demand fresh air partial pressure calculation block 74 retrieves a Pia map according to the engine rotational speed NE and the demand fresh air flow rate Giades in order to calculate a demand fresh air partial pressure map value Piamapd. The demand fresh air partial pressure is a desired value of the fresh air partial pressure in the intake gases of the engine 1. The Pia map is set corresponding to the condition where the intake air temperature TI is equal to a predetermined temperature TINOR.

A mass Mia of fresh air occupying a volume of one cylinder and a demand fresh air partial pressure map value Piamapd have a relationship expressed by the following equation (1).

$$Piamapd = \{R \times TINOR/(\eta v \times Vs)\} Mia \quad (1)$$

where "R" is the gas constant, ηv is a volumetric efficiency, and Vs is a volume of the cylinder.

From the equation (1), the demand fresh air partial pressure Piades corresponding to the intake air temperature TI is derived by the following equation (2).

$$Piades = (TI/TINOR) Piamapd \quad (2)$$

The temperature correction block 76 applies the detected intake air temperature TI to the equation (2) to correct the map value Piamapd, thereby calculating the demand fresh air partial pressure Piades.

The subtracting block 77 subtracts the demand fresh air partial pressure Piades from the demand intake pressure Pides to calculate a demand recircurated gas partial pressure Pirdes.

Referring to FIG. 2, the target power calculation block 53 retrieves a Wcref map according to the demand intake pressure Pides, the demand fresh air flow rate Giades, and the atmospheric pressure PA, in order to calculate a target power Wcref of the compressor 16. The Wcref map is set so that the target power Wcref increases as the demand intake pressure Pides or the demand fresh air flow rate Giades increase or the atmospheric pressure PA decreases. The target power Wcref may alternatively be calculated by the equation (3a). The actual power estimation block 54 applies the detected boost pressure PB and the detected intake air flow rate GA to the equation (3b) to calculate an actual power estimated value Wcest of the compressor 16.

$$Wcref = \frac{1}{\eta cmp} Giades \cdot cp \cdot TA \left\{ \left( \frac{Pides}{PA} \right)^{\frac{\kappa a - 1}{\kappa a}} - 1 \right\} \quad (3a)$$

$$Wcest = \frac{1}{\eta cmp} GA \cdot cp \cdot TA \left\{ \left( \frac{PB}{PA} \right)^{\frac{\kappa a - 1}{\kappa a}} - 1 \right\} \quad (3b)$$

where ηcmp is an efficiency of the compressor, cp is an isopiestic specific heat of air, TA is an atmospheric temperature, and κa is a specific heat ratio of air.

The target exhaust pressure calculation block 55 calculates the target exhaust pressure Peref so that the actual power estimated value Wcest coincides with the target power Wcref. Specifically, when the actual power estimated value Wcest is smaller than the target power Wcref, the target exhaust pressure calculation block 55 updates the target exhaust pressure Peref in the increasing direction, and when the actual power estimated value Wcest is greater than the target power Wcref, the target exhaust pressure calculation block 55 updates the target exhaust pressure Peref in the decreasing direction.

The target intake pressure calculation block 56 compares the detected boost pressure PB with the demand intake pressure Pides and selects the lower value to calculate the target intake pressure Piref. The dividing block 52 divides the demand recirculated gas partial pressure Pirdes by the demand intake pressure Pides to calculate a demand recirculated gas ratio RPIR. The multiplying block 57 multiplies the target intake pressure Piref and the demand recirculated gas ratio RPIR to calculate a target recirculated gas partial pressure Pirref. The subtracting block 58 subtracts the target recirculated gas partial pressure Pirref from the target intake pressure Piref to calculate a target fresh air partial pressure Piaref.

Figure 4:
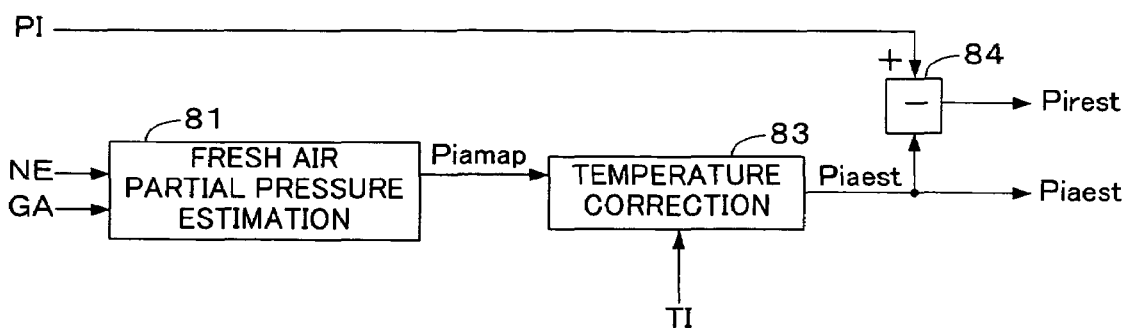
FIG. 4 is a block diagram illustrating a configuration of a partial pressure estimation block shown in FIG. 2.

As shown in FIG. 4, the partial pressure estimation block 59 includes a fresh air partial pressure estimation block 81, a temperature correction block 83, and a subtracting block 84. The fresh air partial pressure estimation block 81 calculates a fresh air partial pressure estimation map value Piamap according to the detected engine rotational speed NE and the detected intake air flow rate GA. The fresh air partial pressure estimation map value Piamap is calculated to increase as the intake air flow rate GA increases or the engine rotational speed NE decreases. Specifically, the fresh air partial pressure estimation map value Piamap is set to be proportional to the intake air flow rate GA and set to be inversely proportional to the engine rotational speed NE. The temperature correction block 83 corrects the fresh air partial pressure estimation map value Piamap according to the detected intake air temperature TI to calculate an estimated fresh air partial pressure Piaest, like the temperature correction block 76 shown in FIG. 3. The subtracting block 84 subtracts the estimated fresh air partial pressure Piaest from the detected intake pressure PI to calculate an estimated recirculated gas partial pressure Pirest.

Referring to FIG. 2, the model predictive controller 60 calculates a turbine gas flow rate command value Gvcmd, a fresh air flow rate command value Gthcmd, and a recirculated gas flow rate command value Grcmd using the model predictive control so that the detected exhaust pressure PE, the estimated fresh air partial pressure Piaest, and the estimated recirculated gas partial pressure Pirest coincide, respectively, with the target exhaust pressure Peref, the target fresh air partial pressure Piaref, and the target recirculated gas partial pressure Pirref. The turbine gas flow rate command value Gvcmd is a command value of a flow rate of gases passing through the turbine 11. The fresh air flow rate command value Gthcmd is a command value of a flow rate of fresh air passing through the throttle valve 3, and the recirculated gas flow rate command value Grcmd is a command value of a flow rate of recirculated gases passing through the EGR valve 6.

The θv conversion block 61 converts the turbine gas flow rate command value Gvcmd to an opening command value of the movable vane 12 (hereinafter referred to as "vane opening command value") θv according to the detected exhaust pressure PE and the detected atmospheric pressure PA. Specifically, the θv conversion block 61 performs the conversion as described below.

The relationship of the following equation (4) is satisfied by modeling the turbine 11 as a nozzle.

$$Gvcmd = Atb(\theta vcmd) \times U(PE) \times \Phi(PA/PE) \tag{4}$$

In the above equation, Atb (θvcmd) is an effective opening area of the movable vanes, which is a function of the vane opening, U(PE) is an upstream condition function calculated by the following equation (5), and Φ(PA/PE) is a function of a ratio of the downstream side pressure and the upstream side pressure of the movable vane 12. In the equation (5), ρe is a density of the exhaust gases passing through the turbine 11, and in the equations (6) and (7), κe is a specific heat ratio of the exhaust gases passing through the turbine 11. When the flow velocity of exhaust gases is lower than the acoustic velocity, the equation (6) is applied, and the equation (7) is applied when the flow velocity of exhaust gases is equal to or higher than the acoustic velocity.

$$U(PE) = \sqrt{2PE \cdot \rho e} \tag{5}$$

$$\Phi = \sqrt{\frac{\kappa e}{\kappa e - 1}\left\{\left(\frac{PA}{PE}\right)^{\frac{2}{\kappa e}} - \left(\frac{PA}{PE}\right)^{\frac{\kappa e+1}{\kappa e}}\right\}} \quad \left(\frac{PA}{PE}\right) > \left(\frac{2}{\kappa e+1}\right)^{\frac{\kappa e}{\kappa e-1}} \tag{6}$$

$$\Phi = \left(\frac{2}{\kappa e+1}\right)^{\frac{\kappa e}{\kappa e-1}} \sqrt{\frac{\kappa e}{\kappa e+1}} \quad \left(\frac{PA}{PE}\right) \leq \left(\frac{2}{\kappa e+1}\right)^{\frac{\kappa e}{\kappa e-1}} \tag{7}$$

The effective opening area Atb(θvcmd) is calculated by the equation (8) obtained from the equation (4), and the vane opening command value θvcmd is calculated by retrieving a conversion table previously set according to the effective opening area Atb(θvcmd).

$$Atb(\theta vcmd) = Gvcmd / \{U(PE) \times \Phi(PA/PE)\} \tag{8}$$

The θth conversion block 62 and the θr conversion block 63, respectively, calculate an effective opening area Ath(θth) of the throttle valve 3 and an effective opening area Ar(θr) of the EGR valve 6 by equations (9) and (10), and, respectively, retrieve conversion tables according to the effective opening areas Ath(θth) and Ar(θr) to calculate the throttle valve opening command value θthcmd and the EGR valve opening command value θrcmd.

$$Ath(\theta thcmd) = Gthcmd / \{U(PB) \times \Phi(PI/PB)\} \tag{9}$$

$$Ar(\theta rcmd) = Grcmd / \{U(PE) \times \Phi(PI/PE)\} \tag{10}$$

U(PB) and Φ(PI/PB) in the equation (9), and Φ(PI/PE) in the equation (10) are given by equations (11) to (15).

$$U(PB) = \sqrt{2PB \cdot \rho a} \tag{11}$$

$$\Phi = \sqrt{\frac{\kappa a}{\kappa a - 1}\left\{\left(\frac{PI}{PB}\right)^{\frac{2}{\kappa a}} - \left(\frac{PI}{PB}\right)^{\frac{\kappa a+1}{\kappa a}}\right\}} \quad \left(\frac{PI}{PB}\right) > \left(\frac{2}{\kappa a+1}\right)^{\frac{\kappa a}{\kappa a-1}} \tag{12}$$

$$\Phi = \left(\frac{2}{\kappa a+1}\right)^{\frac{\kappa a}{\kappa a-1}} \sqrt{\frac{\kappa a}{\kappa a+1}} \quad \left(\frac{PI}{PB}\right) \leq \left(\frac{2}{\kappa a+1}\right)^{\frac{\kappa a}{\kappa a-1}} \tag{13}$$

$$\Phi = \sqrt{\frac{\kappa e}{\kappa e - 1}\left\{\left(\frac{PI}{PE}\right)^{\frac{2}{\kappa e}} - \left(\frac{PI}{PE}\right)^{\frac{\kappa e+1}{\kappa e}}\right\}} \quad \left(\frac{PI}{PE}\right) > \left(\frac{2}{\kappa e+1}\right)^{\frac{\kappa e}{\kappa e-1}} \tag{14}$$

$$\Phi = \left(\frac{2}{\kappa e+1}\right)^{\frac{\kappa e}{\kappa e-1}} \sqrt{\frac{\kappa e}{\kappa e+1}} \quad \left(\frac{PI}{PE}\right) \leq \left(\frac{2}{\kappa e+1}\right)^{\frac{\kappa e}{\kappa e-1}} \tag{15}$$

where ρa in the equation (11) is a density of air, and κa in equations (12) and (13) is the specific heat ratio of air.

The opening of the movable vane 12, the opening of the throttle valve 3, and the opening of the EGR valve 6 are controlled based on the vane opening command value θvcmd, the throttle valve opening command value θth, and the EGR valve opening command value θr, respectively, output from the θv conversion block 61, the θth conversion block 62, and the θr conversion block 63.

Next, the model predictive controller 60 is explained. First, a controlled object model obtained by modeling the controlled object of the controller 60 is explained.

The relationship between a mass M and a pressure P of gases in a chamber of a volume V is expressed by equation (20) using an absolute temperature T.

$$PV = MRT \tag{20}$$

Equation (21) is obtained by differentiating the equation (20) with respect to time.

$$\frac{dP}{dt} = \kappa n \frac{RT}{V} \frac{dM}{dt} \tag{21}$$

where κn is a polytropic index, which takes a value greater than "1.0" and equal to or less than the specific heat ratio κ of the gas in the chamber.

The relationship of the equation (21) is applied to the fresh air partial pressure Pia in the intake pipe 2 to obtain equation (22).

$$\frac{d}{dt}Pia = ki\left(G'th - \frac{Pia}{Pi}G'z\right) \tag{22}$$

where G'th is a fresh air flow rate per unit time period passing through the throttle valve 3, G'z is an intake gas flow rate per unit time period flowing into the cylinder, and Pi is an intake pressure. Further, the constant ki is given by equation (23).

$$ki = \kappa ni \frac{RTi}{Vi} \tag{23}$$

where Ti is an intake air temperature, Vi is a volume of a portion downstream of the throttle valve 3 in the intake pipe, and κni is a polytropic index.

Since the intake gas flow rate G'z in equation (22) can be expressed with equation (24), equation (22) is expressed by equation (25).

$$G'z = \frac{NE}{2} \cdot Pcyl \frac{Vcyl}{RTcyl} \cong \eta v \cdot \frac{NE}{2} \cdot Pi \frac{Vcyl}{RTi} = k'_{\eta v} Pi \tag{24}$$

$$\left(k'_{\eta v} = \frac{NE \eta v}{2} \cdot \frac{Vcyl}{RTi}\right)$$

$$\frac{d}{dt} Pia = -k'_{\eta v} ki \cdot Pia + ki \cdot G'th \tag{25}$$

where NE is an engine rotational speed, Pcyl is a pressure in the cylinder, Vcyl is a cylinder volume, Tcyl is a temperature in the cylinder, and ηv is a volumetric efficiency.

In equation (25), the coefficient of the fresh air partial pressure Pia is dependent on the engine rotational speed NE. Therefore, equation (25) is converted to an equation based on the crank angle α (specifically, "dt/dα=1/NE" is multiplied with both sides of equation (25)) to obtain equation (26). Gth in equation (26) is a flow rate of fresh air passing through the throttle valve 3 per unit crank angle period.

Regarding the recirculated gas partial pressure Pir in the intake pipe, equation (27) is similarly obtained. In equation (27), Gr is a flow rate of recirculated gases passing through the EGR valve 6 per unit crank angle period.

$$\frac{d}{d\alpha} Pia = -k_{\eta v} ki \cdot Pia + ki \cdot Gth \tag{26}$$

$$\left(k_{\eta v} = \frac{\eta v}{2} \cdot \frac{Vcyl}{RTi}\right)$$

$$\frac{d}{d\alpha} Pir = -k_{\eta v} ki \cdot Pia + ki \cdot Gr \tag{27}$$

On the other hand, equation (28) is satisfied with respect to the exhaust gases on the upstream side of the turbine in the exhaust pipe 4.

$$\frac{d}{dt} Pe = ke(G'z - G'r - G'v) \tag{28}$$

$$\left(ke = \kappa ne \frac{RTe}{Ve}\right)$$

where Pe is an exhaust pressure on the upstream side of the turbine in the exhaust pipe 4, G'r is a flow rate of recirculated gases per unit time, Te is a temperature of exhaust gases, Ve is a volume of a portion upstream of the turbine in the exhaust pipe, and κne is a polytropic index.

The intake gas flow rate G'z is expressed by equation (29) by transforming equation (24).

$$G'z = k'_{\eta v} \times Pi = k'_{\eta v}(Pia + Pir) \tag{29}$$

The relationship expressed by equation (29) is applied to equation (28) to obtain equation (30), wherein equation (30) is further transformed to equation (31) based on the crank angle.

$$\frac{d}{dt} Pe = k'_{\eta v} ke(Pia + Pir) - ke(G'r + G'v) \tag{30}$$

$$\frac{d}{d\alpha} Pe = k_{\eta v} ke(Pia + Pir) - ke(Gr + Gv) \tag{31}$$

Equation (32) is obtained by combining the equations (26), (27), and (31).

$$\frac{d}{d\alpha}\begin{bmatrix} Pia \\ Pir \\ Pe \end{bmatrix} = \begin{bmatrix} -k_{\eta v} ki & 0 & 0 \\ 0 & -k_{\eta v} ki & 0 \\ k_{\eta v} ke & k_{\eta v} ke & 0 \end{bmatrix}\begin{bmatrix} Pia \\ Pir \\ Pe \end{bmatrix} + \begin{bmatrix} ki & 0 & 0 \\ 0 & ki & 0 \\ 0 & -ke & -ke \end{bmatrix}\begin{bmatrix} u_{th} \\ u_r \\ u_v \end{bmatrix} \tag{32}$$

$$\begin{bmatrix} u_{th} \\ u_r \\ u_v \end{bmatrix} = [\, Gth \quad Gr \quad Gv \,]^T$$

Next, the controlled object model defined by equation (32) is converted to a controlled object model of a discrete time system using time k obtained by digitizing analog time t with a sampling period h. The digitized controlled object model is defined by equation (34). The control output x(k), the control input u(k), and the model parameter matrix A and B in equation (34) are expressed by equations (35)-(38).

$$x(k+1) = Ax(k) + Bu(k) \tag{34}$$

$$x(k) = \begin{bmatrix} Pia(k) \\ Pir(k) \\ Pe(k) \end{bmatrix} \tag{35}$$

$$u(k) = \begin{bmatrix} Gth(k) \\ Gr(k) \\ Gv(k) \end{bmatrix} \tag{36}$$

$$A = \begin{bmatrix} 1 - hk_{\eta v} ki & 0 & 0 \\ 0 & 1 - hk_{\eta v} ki & 0 \\ hk_{\eta v} ke & hk_{\eta v} ke & 1 \end{bmatrix} \tag{37}$$

$$B = \begin{bmatrix} hki & 0 & 0 \\ 0 & hki & 0 \\ 0 & -hke & -hke \end{bmatrix} \tag{38}$$

Figure 5:
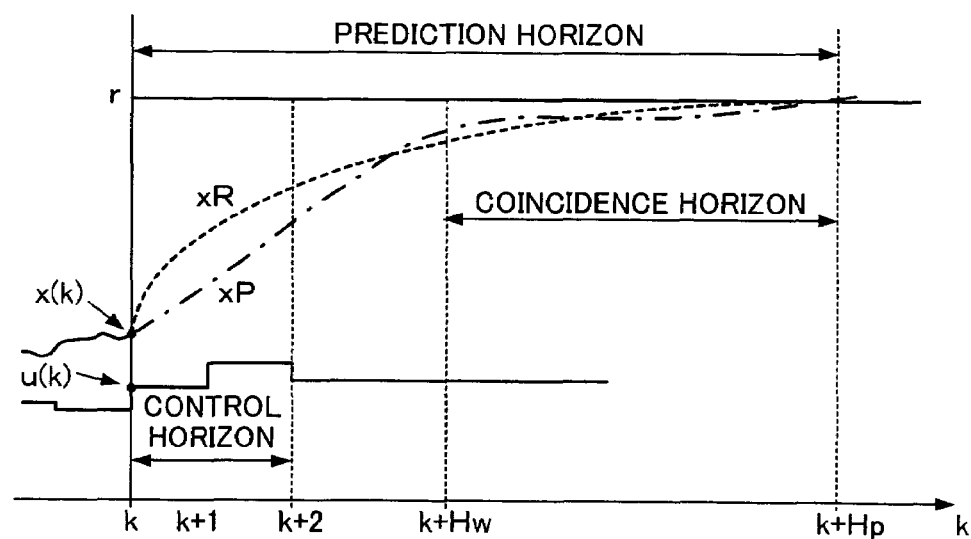
FIG. 5 is a figure explaining an outline of a model predictive control.

FIG. 5 explains an outline of the model predictive control. In FIG. 5, the control wherein the control output x(k) is made to coincide with a target value (target vector) r is shown. The control operation is performed using the following method.

1) The output x(k) is measured at the present time k, and the reference trajectory xR that is gradually approaching the target value r is calculated.

2) The predicted value xP(k+i) of the future output is calculated using the predicting equation, and control inputs u(k), u(k+1), ..., u(k+Hu−1) are calculated with an optimizing operation algorithm in the control horizon that is a period of Hu steps (Hu=2 in FIG. 5) after the present time k so that the predicted value xP approaches the reference trajectory xR as nearly as possible in the coincidence horizon.

3) Only one control input u(k) of the calculated control inputs u(k), u(k+1), ..., u(k+Hu−1) is actually input to the controlled object.

4) The above steps 1) to 3) are repeated at time (k+1) and thereafter.

Next, the details of the model predictive control are now described. For example, the output x(k+2) is given by equation (39) which is obtained by repeatedly using equation (34). In general, the output x(k+i), which is an output after a discrete time period i has elapsed, is given by equation (40).

$$x(k+2)=A^2x(k)+ABu(k)+Bu(k+1) \quad (39)$$

$$x(k+i)=A^ix(k)+A^{i-1}Bu(k)+\ldots+Bu(k+i-1) \quad (40)$$

The predicted value x(k+i) of the control output x is calculated on the assumption that the control input u changes in the control horizon from time k to time (k+Hu−1) and thereafter takes a constant value. The present control input u(k) is determined so that the predicted value x(k+i) coincides with the target value in the coincidence horizon (the value of an evaluation function V which indicates a deviation from the target value becomes minimum).

In order to determine the control input u(k), the following method is used. First, equation (40) is transformed to an equation defined by using a control input change amount Δu(k), and the optimal control input change amount Δu(k)opt is calculated. Second, the optimal control input change amount Δu(k)opt is accumulated to calculate the control input u(k).

The relationship between the control input change amount Δu(k) and the control input u(k) is expressed by equation (41).

$$u(k)=\Delta u(k)+u(k-1) \quad (41)$$

Equations (42) and (43) are obtained by transforming equation (40) using the relationship of equation (41). Equation (42) is applied in the period wherein the discrete time i is "1" to "Hu", and equation (43) is applied in the period wherein the discrete time i is "(Hu+1)" to "Hp". In equations (42) and (43), "I" is a unit matrix. Equation (44) is obtained by combining equations (42) and (43) in order to be expressed in the form of a matrix and vectors.

$$x(k+i) = A^i x(k) + (A^{i-1} + \ldots + A + I)B\Delta u(k) + \ldots + \quad (42)$$
$$B\Delta u(k+i-1) + (A^{i-1} + \ldots + A + I)$$
$$Bu(k-1)(i = 1 \sim Hu)$$

$$x(k+i) = A^i x(k) + (A^{i-1} + \ldots + A + I)B\Delta u(k) + \ldots + \quad (43)$$
$$(A^{i-Hu} + \ldots + A + I)B\Delta u(k+Hu-1) +$$
$$(A^{i-1} + \ldots + A + I)Bu(k-1)(i = Hu+1 \sim Hp)$$

-continued $$\begin{bmatrix} x(k+1) \\ \vdots \\ x(k+Hu) \\ x(k+Hu+1) \\ \vdots \\ x(k+Hp) \end{bmatrix} = \begin{bmatrix} A \\ \vdots \\ A^{Hu} \\ A^{Hu+1} \\ \vdots \\ A^{Hp} \end{bmatrix} x(k) + \begin{bmatrix} B \\ \vdots \\ \sum_{i=0}^{Hu-1} A^i B \\ \sum_{i=0}^{Hu} A^i B \\ \vdots \\ \sum_{i=0}^{Hp-1} A^i B \end{bmatrix} u(k-1) + \quad (44)$$

$$\begin{bmatrix} B & \ldots & 0 \\ AB+B & \ldots & 0 \\ \vdots & \ddots & \vdots \\ \sum_{i=0}^{Hu-1} A^i B & \ldots & B \\ \sum_{i=0}^{Hu} A^i B & \ldots & AB+B \\ \vdots & \vdots & \vdots \\ \sum_{i=0}^{Hp-1} A^i B & \ldots & \sum_{i=0}^{Hp-Hu} A^i B \end{bmatrix} \begin{bmatrix} \Delta u(k) \\ \vdots \\ \Delta u(k+Hu-1) \end{bmatrix}$$

Next, if the evaluation function V is defined by equation (45), equation (45) can be written as equation (49) by defining vectors X(k), T(k), and ΔU(k) with equations (46)-(48). In equation (45), Q(i) and R(i) are weighting coefficients, and the weighting matrix Q and R in equation (49) are given by equations (50) and (51).

$$V(k) = \sum_{i=Hw}^{Hp} \|x(k+i) - r(k+i)\|_{Q(i)}^2 + \sum_{i=0}^{Hu-1} \|\Delta u(k+i)\|_{R(i)}^2 \quad (45)$$

$$X(k) = \begin{bmatrix} x(k+Hw) \\ \vdots \\ x(k+Hp) \end{bmatrix} \quad (46)$$

$$T(k) = \begin{bmatrix} r(k+Hw) \\ \vdots \\ r(k+Hp) \end{bmatrix} \quad (47)$$

$$\Delta U(k) = \begin{bmatrix} \Delta u(k) \\ \vdots \\ \Delta u(k+Hu-1) \end{bmatrix} \quad (48)$$

$$V(k) = \|X(k) - T(k)\|_Q^2 + \|\Delta U(k)\|_R^2 \quad (49)$$

$$Q = \begin{bmatrix} Q(Hw) & 0 & \ldots & 0 \\ 0 & Q(Hw+1) & \ldots & \vdots \\ \vdots & \vdots & \ddots & \vdots \\ 0 & 0 & \ldots & Q(Hp) \end{bmatrix} \quad (50)$$

-continued $$R = \begin{bmatrix} R(0) & 0 & \cdots & 0 \\ 0 & R(1) & \cdots & \vdots \\ \vdots & \vdots & \ddots & \vdots \\ 0 & 0 & \cdots & R(Hu-1) \end{bmatrix} \quad (51)$$

Further, if the coefficient matrixes in equation (44) are expressed by $\psi$, $\Gamma$, and $\Theta$ as equations (52)-(54), the predicted value vector X(k) in the coincidence horizon ((k+Hw)-(k+Hp)) is expressed by equation (55).

$$\Psi = \begin{bmatrix} A^{Hw} \\ \vdots \\ A^{Hp} \end{bmatrix} \quad (52)$$

$$\Gamma = \begin{bmatrix} \sum_{i=0}^{Hw-1} A^i B \\ \vdots \\ \sum_{i=0}^{Hp-1} A^i B \end{bmatrix} \quad (53)$$

$$\Theta = \begin{bmatrix} \sum_{i=0}^{Hw-1} A^i B & \cdots & \sum_{i=0}^{Hw-Hu} A^i B \\ \vdots & \ddots & \vdots \\ \sum_{i=0}^{Hp-1} A^i B & \cdots & \sum_{i=0}^{Hp-Hu} A^i B \end{bmatrix} \quad (54)$$

$$X(k) = \Psi x(k) + \Gamma u(k-1) + \Theta \Delta u(k) \quad (55)$$

If a tracking error $\epsilon(k)$ is defined by equation (56), the evaluation function V of equation (49) is transformed to equation (57).

$$\epsilon(k) = T(k) - \Psi x(k) - \Gamma u(k-1) \quad (56)$$

$$V(k) = \|\Theta \Delta U(k) - \epsilon(k)\|_Q^2 + \|\Delta U(k)\|_R^2 \quad (57)$$

Further, if matrixes SQ and SR, which correspond respectively to square roots of the weighting matrixes Q and R, are defined by equations (58) and (59), a squared length of the vector expressed by equation (60) corresponds to the evaluation function V.

$$SQ = \begin{bmatrix} \sqrt{Q(Hw)} & 0 & \cdots & 0 \\ 0 & \sqrt{Q(Hw+1)} & \cdots & \vdots \\ \vdots & \vdots & \ddots & \vdots \\ 0 & 0 & \cdots & \sqrt{Q(Hp)} \end{bmatrix} \quad (58)$$

$$SR = \begin{bmatrix} \sqrt{R(0)} & 0 & \cdots & 0 \\ 0 & \sqrt{R(1)} & \cdots & \vdots \\ \vdots & \vdots & \ddots & \vdots \\ 0 & 0 & \cdots & \sqrt{R(Hu-1)} \end{bmatrix} \quad (59)$$

$$\begin{bmatrix} SQ\{\Theta \Delta U(k) - \epsilon(k)\} \\ SR \Delta U(k) \end{bmatrix} \quad (60)$$

Therefore, the optimal control input change amount vector $\Delta U(k)opt$ is calculated as a control input change amount vector $\Delta U(k)$ that makes the length of the vector expressed by equation (60) minimum. This calculation can be performed with the QR algorithm (e.g., refer to "Predictive Control with Constraints" by Jan M. Maciejowski, Japanese version published on Jan. 20, 2005 by Tokyo Denki University Press (hereinafter referred to as "document 1")).

By using the expression shown in document 1, the optimal control input change amount vector $\Delta U(k)opt$ is expressed by equations (61), (62), and (63). The back slash included in equation (63) indicates the operation for calculating the least-square solution. In equation (62), $I_m$ is a unit matrix having m-rows and m-columns, and $0_m$ is a matrix having m-rows and m-columns whose elements are all "0". The matrix $[I_m 0_m 0_m \ldots 0_m]$ is a matrix for extracting only the vector $\Delta u(k)opt$ that is actually used in the calculation of the control input u(k) from the vector $\Delta U(k)$.

$$\Delta u(k)opt = KMPC \cdot \epsilon(k) \quad (61)$$

$$KMPC = [I_m 0_m 0_m \ldots 0_m] KFULL \quad (62)$$

$$KFULL = \begin{bmatrix} SQ\Theta \\ SR \end{bmatrix} \setminus \begin{bmatrix} SQ \\ 0 \end{bmatrix} \quad (63)$$

Figure 6:
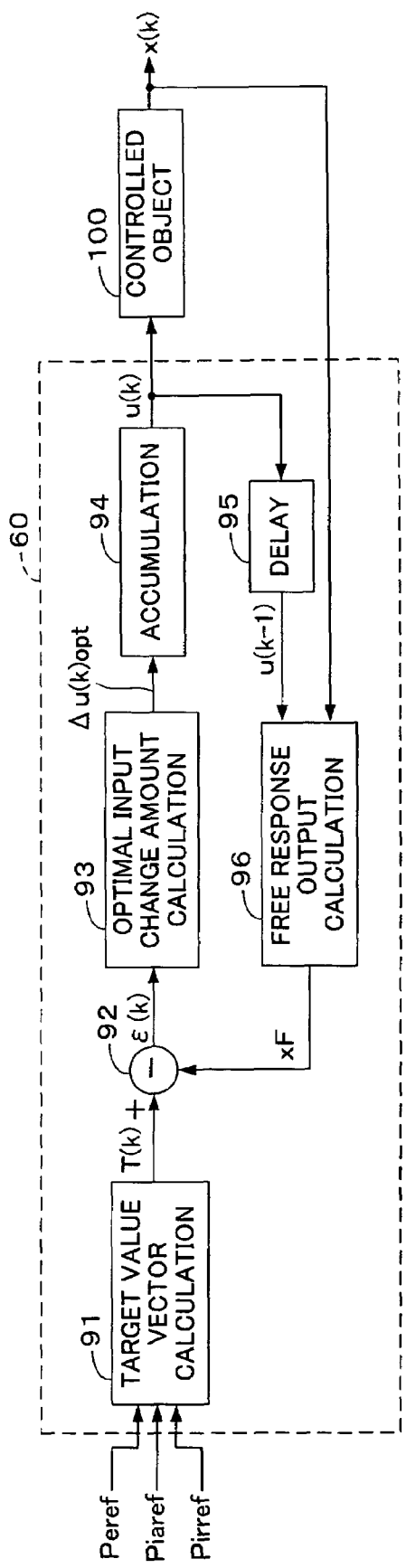
FIG. 6 illustrates a configuration of a model predictive controller shown in FIG. 2.

FIG. 6 is a functional block diagram showing a configuration of the model predictive controller 60. The model predictive controller 60 includes a target value vector calculation block 91, a subtracting block 92, an optimal input change amount calculation block 93, an accumulation block 94, a delay block 95, and a free response output calculation block 96. FIG. 6 shows a configuration in which the control input u(k) is input to the controlled object 100, and the control output x(k) is fed back to the model predictive controller 60.

In the present embodiment, the parameter Hu, which determines the control horizon, and the parameter Hw, which determines the start time of the coincidence horizon, are set to "1"; the parameter Hp, which determines the end time of the coincidence horizon, is set to "2"; and each of the weighting matrixes Q and R is set to a unit matrix whose diagonal elements are all "1" and other elements are all "0" (i.e., no weighting is substantially applied). Therefore, the matrixes SQ and SR necessary to calculate the optimal input change amount $\Delta u(k)opt$ are given by equations (65) and (66), and the matrix $\Theta$ is given by equation (67). The matrixes $\psi$ and $\Gamma$ necessary to calculate the tracking error $\epsilon(k)$ and the target value vector T(k) are given by equations (68)-(70).

$$SQ = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \quad (65)$$

$$SR = \begin{bmatrix} 1 & 0 & 0 \\ 0 & 1 & 0 \\ 0 & 0 & 1 \end{bmatrix} \quad (66)$$

$$\Theta = \begin{bmatrix} B \\ AB \end{bmatrix} \quad (67)$$

$$\Psi = \begin{bmatrix} A \\ A^2 \end{bmatrix} \quad (68)$$

-continued $$\Gamma = \begin{bmatrix} B \\ AB \end{bmatrix} \quad (69)$$

$$T(k) = \begin{bmatrix} r(k+1) \\ r(k+2) \end{bmatrix} \quad (70)$$

The target value vector calculation block 91 of FIG. 6 calculates the target value vector T(k) using the following.

1) The present control deviation e(k) is calculated by equation (71). In equation (71), s(k) is input to the target value vector calculation block 91 and given by equation (72) in this embodiment (hereinafter referred to as "setting value vector").

$$e(k) = s(k) - x(k) \quad (71)$$

$$S(k) = \begin{bmatrix} Piaref(k) \\ Pirref(k) \\ Peref(k) \end{bmatrix} \quad (72)$$

2) The control deviation e(k+i) after i steps (after discrete time period i has elapsed) is calculated by equation (73).

$$e(k+i) = \lambda^i \times e(k) \quad (73)$$

In equation (73), $\lambda$ is a parameter indicative of a speed at which the output x(k+i) approaches the target value r(k+i) ($\lambda$ is hereinafter referred to as "convergence speed parameter"). The convergence speed parameter $\lambda$ is set to a value between "0" and "1". The convergence speed becomes higher as the convergence speed parameter $\lambda$ is set to a smaller value.

3) The target value r(k+i) indicating the reference trajectory is calculated by equation (74).

$$r(k+i) = s(k+i) - e(k+i) \quad (74)$$

In this embodiment, the future setting value vector s(k+i) is set to be equal to the present setting value vector s(k) (i.e., the setting value vector s(k) is constant) and the target value vector T(k) is calculated by equation (75).

$$T(k) = \begin{bmatrix} Piaref(k) - \lambda(Piaref(k) - Piaest(k)) \\ Pirref(k) - \lambda(Pirref(k) - Pirest(k)) \\ Peref(k) - \lambda(Peref(k) - PE(k)) \\ Piaref(k) - \lambda^2(Piaref(k) - Piaest(k)) \\ Pirref(k) - \lambda^2(Pirref(k) - Pirest(k)) \\ Peref(k) - \lambda^2(Peref(k) - PE(k)) \end{bmatrix} \quad (75)$$

The delay block 95 delays the control input u(k) by one sampling period to output the control input u(k−1). The free response output calculation block 96 applies the control output x(k) and the control input u(k−1) to equation (76) to calculate a free response output xF.

$$XF = \Psi x(k) + \Gamma u(k-1) \quad (76)$$

Equation (76) is obtained by replacing $\Delta u(k)$ in equation (55) with "0", and the free response output xF corresponds to a control output obtained when the control input u(k) is constant.

The subtracting block 92 subtracts the free response output xF from the target value vector T(k). The optimal input change amount calculation block 93 calculates the optimal input change amount $\Delta u(k)$opt with equation (56). The accumulation block 94 accumulates the optimal input change amount $\Delta u(k)$opt to calculate the control input u(k). The model predictive controller 60 outputs the calculated control input $u(k) = (Gth(k) \; Gr(k) \; Gv(k))^T$ as the fresh air flow rate command value Gthcmd(k), the recirculated gas flow rate command value Grcmd(k), and the turbine gas flow rate command value Gvcmd(k).

FIGS. 7A-7F show time charts illustrating an example of the control operation in this embodiment. FIGS. 7A-7C illustrate changes in the control input u(k), i.e., Gthcmd(k), Grcmd(k), and Gvcmd(k), and FIGS. 7D-7F illustrate changes in the corresponding control output x(k), i.e., Piaest, Pirest, and PE. At time t1, the EGR valve 6 is opened to increase the recirculated gas partial pressure Pir in the intake pipe. At the same time, the vane opening of the turbine 11 is controlled to slightly change in the closing direction to maintain the exhaust pressure at a constant level. At time t2, the vane opening is controlled to change in the closing direction to increase the exhaust pressure PE, and at the same time, the opening of the EGR valve 6 is controlled to slightly change in the closing direction to maintain the recirculated gas partial pressure Pie at a constant level. At time t3, the throttle valve is opened to increase the fresh air partial pressure Pia, and at the same time, the vane opening is controlled to greatly change in the opening direction to maintain the exhaust pressure PE at a constant level.

Thus, according to this embodiment, the fresh air partial pressure Pia and the recirculated gas partial pressure Pir in the intake pipe and the exhaust pressure PE, which are the gas parameters relevant to each other, can independently converge to the corresponding target values. Therefore, the gas parameters can appropriately be controlled according to the operating condition of the engine 1, thereby obtaining the maximum performance of the engine 1.

As described above, in this embodiment, the exhaust pressure PE, which is indicative of the state of gases in the exhaust pipe of the engine 1, is detected; the estimated fresh air partial pressure Piaest and the estimated recirculated gas partial pressure Pirest, which are indicative of the state of gases in the intake pipe, are calculated; and the target value Peref of the exhaust pressure and the target values Piaref and Pirref of the fresh air partial pressure and the recirculated gas partial pressure are calculated. Further, the vane opening of the turbine 11, the opening of the EGR valve 6, and the opening of the throttle valve 3 are controlled using the model predictive control so that the exhaust pressure PE, the estimated fresh air partial pressure Piaest, and the estimated recirculated gas partial pressure Pirest, respectively, coincide with the corresponding target values Peref, Piaref, and Pirref. Consequently, the state of the intake gases is optimally controlled and the optimal state of the exhaust gases is maintained.

By using the model predictive control, a plurality of outputs of the controlled object having a plurality of inputs and outputs, i.e., the exhaust pressure PE, the fresh air partial pressure Pia, and the recirculated gas partial pressure Pir, can be made to simultaneously converge to the corresponding target values at the same speed. Consequently, the flow rate control of gases (the fresh air and the recirculated exhaust gases) supplied to the engine is performed totally and precisely, thereby obtaining the maximum engine performance. Further, if the controlled object model can be defined by equations, the control system performing the model predictive control is easily configured. Therefore, the control system is easily applied to various hardware configurations. In other words, the control system has an advantage of high flexibility, and the manpower required for setting maps essential for the control is greatly reduced.

The demand intake pressure Pides, which is a steady state target value corresponding to a steady state of the engine 1, is calculated using the demand intake pressure calculation block 72 according to the engine rotational speed NE and the demand torque TRQ, and the target intake pressure Piref is calculated by selecting the smaller one of the detected boost pressure PB and the demand intake pressure Pides. Further, the target recirculated gas partial pressure Pirref is set to an available value based on the target intake pressure Piref. Accordingly, the target intake pressure Piref and the target recirculated gas partial pressure Pirref are prevented from being set to inappropriate values that are impossible to control due to a delay of change in the boost pressure.

Further, the target power Wcref of the compressor wheel 15 is calculated according to the atmospheric pressure PA, the demand intake pressure Pides, and the demand fresh air flow rate Giades. Also, the estimated actual power Wcest of the compressor wheel 15 is calculated according to the detected boost pressure PB and the detected fresh air flow rate GA. The target exhaust pressure Peref is calculated so that the estimated actual power Wcest of the compressor wheel 15 coincides with the target power Wcref. Further, the vane opening, the EGR valve opening, and the throttle valve opening are calculated so that the detected exhaust pressure PE coincides with the calculated target exhaust pressure Peref. In other words, the cascade control, including the master feedback control which is performed during calculation of the target exhaust pressure Peref, and the slave feedback control which is performed in the calculation of the control amounts of the flow rate control mechanisms (the movable vanes 12 of the turbine, the EGR valve 6, and the throttle valve 3), is performed. Therefore, control performance of the boost pressure control, which has a relatively low or slow response speed, is improved.

The controlled object model is defined using the mass flow rates Gv, Gr, and Gth of gases passing through the movable vane 12, the EGR valve 6, and the throttle valve 3 as control inputs (equations (34)-(38)). Therefore, equations defining the controlled object model are simplified to reduce the calculation load on the CPU in the ECU 20 compared to the control amounts of the movable vane 12, the EGR valve 6, and the throttle valve 3 being used as the control inputs. Further, when the flow rate characteristic of the movable vane 12, the EGR valve 6, or the throttle valve 3 is changed, only a change in the conversion characteristic for converting the flow rate to the valve opening is necessary, and no change in the control logic of the controller 60 that performs the model predictive control is necessary.

Further, by adding a local feedback control wherein the opening of the movable vane 12, the opening of the EGR valve 6, and the opening of the throttle valve 3 are controlled in a feedback manner, control performance against disturbance to the vane opening or the valve opening is improved. This is an effect of the cascade control, and the effect becomes more significant when the response speed of the actual valve opening to the valve opening command value is sufficiently fast (compared with the behavior of intake gases and exhaust gases that are the controlled object of the controller 60).

In this embodiment, the fresh air partial pressure Pia and the recirculated gas partial pressure Pir in the intake pipe correspond to the intake pipe gas parameters. The movable vanes 12 correspond to the exhaust gas flow rate changing means, and the exhaust pressure sensor 25 corresponds to the exhaust pressure detecting means. The intake air flow rate sensor 21, the intake air temperature sensor 23, the intake pressure sensor 24, and the ECU 20 correspond to the intake pipe gas parameter obtaining means. The ECU 20 corresponds to the first target value calculating means, the second target value calculating means, the gas control means, the steady state target value calculating means, the modifying means, the target power value calculating means, the estimated power value calculating means, and the feedback calculating means.

Specifically, the demand value calculation block 51, the target power calculation block 53, the actual power estimation block 54, and the target exhaust pressure calculation block 55 correspond to the first target value calculating means. The demand value calculation block 51, the dividing block 52, the target intake pressure calculation block 56, the multiplying block 57, and the subtracting block 58 correspond to the second target value calculating means. The model predictive controller 60, the θv conversion block 61, the θth conversion block 62, and the θr conversion block 63 correpond to the gas control means. The demand value calculation block 51 corresponds to the steady state target value calculating means, while the target intake pressure calculation block 56 corresponds to the modifying means. The target power calculation block 53 corresponds to the target power value calculating means, and the autual power estimation block 54 corresponds to the estimated power value calculating means.

Figure 8:
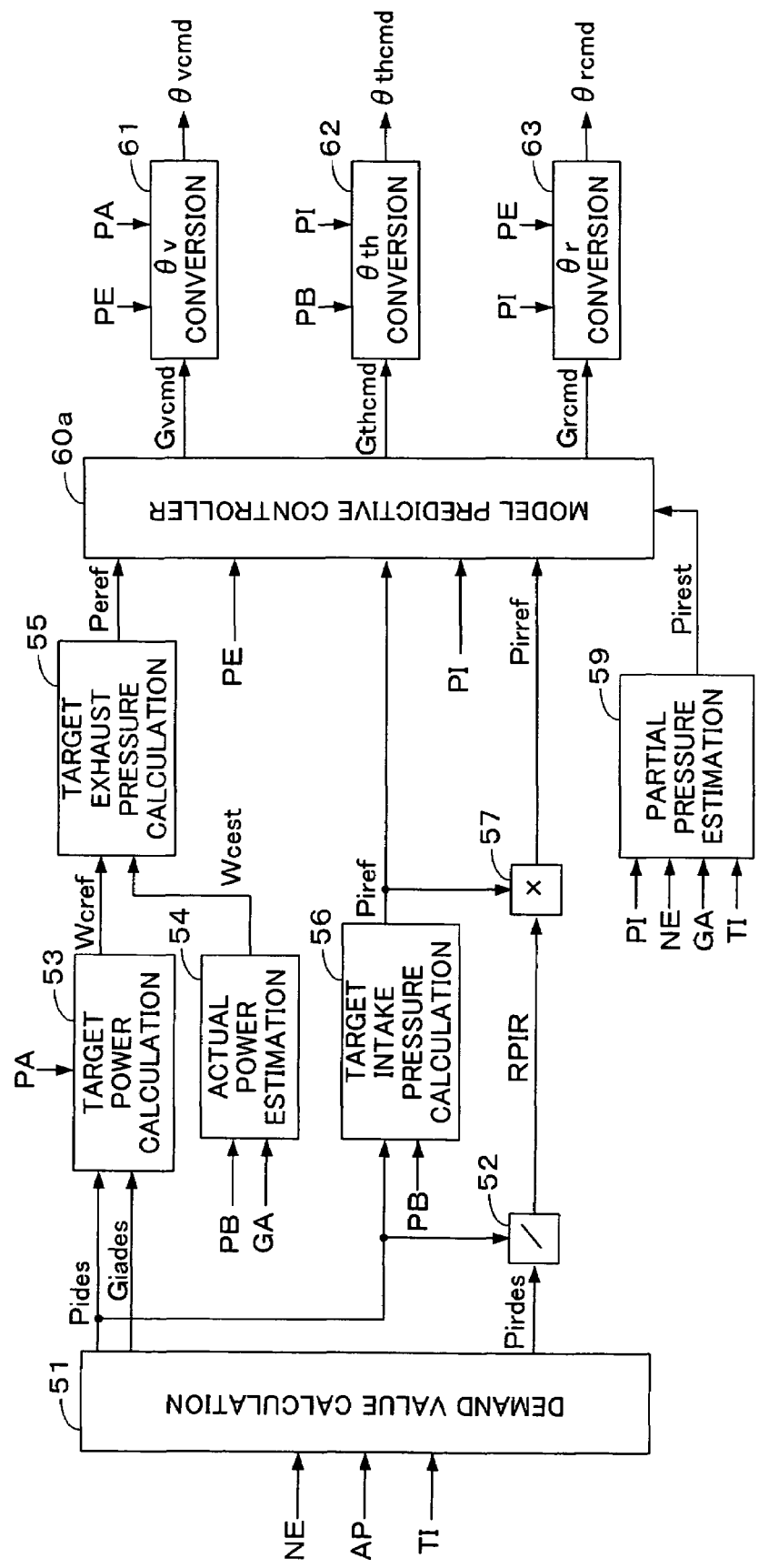
FIG. 8 is a block diagram illustrating a configuration of an intake and exhaust gas state control module according to a first modification of the first embodiment.

In the first embodiment described above, the fresh air partial pressure Pia and the recirculated gas partial pressure Pir are used as the intake pipe gas parameters. Alternatively, in a modification of the first embodiment, any one of the fresh air partial pressure Pia and the recirculated gas partial pressure Pir may be replaced with the intake pressure Pi(=Pia+Pir). In such a case, the intake and exhaust gas state control module is configured as shown in FIG. 8. In the intake and exhaust gas state control module shown in FIG. 8, the intake pressure Pi is used as the intake pipe gas parameter instead of the fresh air partial pressure Pia.

In the module shown in FIG. 8, the model predictive controller 60 of FIG. 2 is modified to a model predictive controller 60a, and the target intake pressure Piref output from the target intake pressure calculation block 56 is directly input to the model predictive controller 60a. Further, the detected intake pressure PI is input to the model predictive controller 60a. The partial pressure estimation block 59 inputs only the estimated recirculated gas partial pressure Pirest to the model predictive controller 60a. The model predictive controller 60a performs the model predictive control based on the controlled object model obtained by modeling the controlled object using the intake pressure Pi instead of the fresh air partial pressure Pia in the first embodiment. That is, the model predictive controller 60a calculates the turbine gas flow rate command value Gvcmd, the fresh air flow rate command value Gthcmd, and the recirculated gas flow rate command value Grcmd so that the detected intake pressure PI, the estimated recirculated gas partial pressure Pirest, and the detected exhaust pressure PE coincide, respectively, with the the target intake pressure Piref, the target recirculated gas partial pressure Pirref, and the target exhaust pressure Peref.

The equation defining the controlled object model (continuous time system) in this embodiment is given by equation (61). Therefore, the control input u(k) can be calculated based on equation (61) with the same method as the above-described embodiment.

$$\frac{d}{d\alpha}\begin{bmatrix} Pi \\ Pir \\ Pe \end{bmatrix} = \begin{bmatrix} -k_{\eta v}ki & -k_{\eta v}ki & 0 \\ 0 & -k_{\eta v}ki & 0 \\ k_{\eta v}ke & k_{\eta v}ke & 0 \end{bmatrix}\begin{bmatrix} Pi \\ Pir \\ Pe \end{bmatrix} + \begin{bmatrix} ki & ki & 0 \\ 0 & ki & 0 \\ 0 & -ke & -ke \end{bmatrix}\begin{bmatrix} u_{th} \\ u_r \\ u_v \end{bmatrix} \quad (61)$$

$$\begin{bmatrix} u_{th} \\ u_r \\ u_v \end{bmatrix} = [\begin{matrix} Gth & Gr & Gv \end{matrix}]^T$$

In this embodiment, the demand value calculation block 51, the dividing block 52, the target intake pressure calculation block 56, and the multiplying block 57 correspond to the second target value calculating means, and the model predictive controller 60a, the θv conversion block 61, the θth conversion block 62, and the θr conversion block 63 correspond to the gas control means.

In another modification of the first embodiment, the fresh air flow rate Gia and the recirculated gas flow rate Gir may be used as the intake pipe gas parameters, instead of the fresh air partial pressure and the recirculated gas partial pressure. The controlled object model in such an example is described below.

Regarding the fresh air partial pressure Pia in the intake pipe, the relationship expressed by the above-described equation (22) is satisfied. By transforming equation (22) using the discrete time k digitized with the sampling period h, equation (62) is obtained.

$$\frac{d}{dt}Pia = ki\left(G'th - \frac{Pia}{Pi}G'z\right) \quad (22)$$

$$\frac{Pia(k+1) - Pia(k)}{h} = ki\left\{G'th(k) - \frac{Pia(k)}{Pi(k)}G'z(k)\right\}$$

$$Pia(k+1) = Pia(k) + hki\left\{G'th(k) - \frac{Pia(k)}{Pi(k)}G'z(k)\right\} \quad (62)$$

Equation (62) is transformed using the relationship of equation (63) to obtain equation (64).

$$G'ia(k) = \frac{Pia(k)}{Pi(k)}G'z(k) \quad (63)$$

$$Pia(k+1) = Pia(k) + hki(G'th(k) - G'ia(k)) \quad (64)$$

On the other hand, by applying the relationship of equation (24) to the fresh air flow rate G'ia, equation (65) is obtained, and equation (66) is obtained from equation (65).

$$G'ia(k) = k'_{\eta v} \cdot Pia(k) \quad (65)$$

$$Pia(k) = \frac{G'ia(k)}{k'_{\eta v}} \quad (66)$$

By applying equation (66) to equation (64), equation (67) is obtained. Further, regarding the recirculated gas flow rate G'ir, equation (68) is similarly obtained.

$$G'ia(k+1) = G'ia(k) + k'_{\eta v}hki(G'th(k) - G'ia(k))$$

$$G'ia(k+1) = (1 - hk'_{\eta v}ki)G'ia(k) + hk'_{\eta v}ki \cdot G'th(k) \quad (67)$$

$$G'ir(k+1) = (1 - hk'_{\eta v}ki)G'ir(k) + hk'_{\eta v}ki \cdot G'r(k) \quad (68)$$

Accordingly, each term in the equation (x(k+1)=Ax(k)+Bu(k)) defining the model of the discrete time system is given by equations (69)-(72).

$$x(k) = \begin{bmatrix} Gia(k) \\ Gir(k) \\ Pe(k) \end{bmatrix} \quad (69)$$

$$u(k) = \begin{bmatrix} Gth(k) \\ Gr(k) \\ Gv(k) \end{bmatrix} \quad (70)$$

$$A = \begin{bmatrix} 1 - hk_{\eta v}ki & 0 & 0 \\ 0 & 1 - hk_{\eta v}ki & 0 \\ hk_{\eta v}ke & hk_{\eta v}ke & 1 \end{bmatrix} \quad (71)$$

$$B = \begin{bmatrix} hk_{\eta v}ki & 0 & 0 \\ 0 & hk_{\eta v}ki & 0 \\ 0 & -hke & -hke \end{bmatrix} \quad (72)$$

Figure 9:
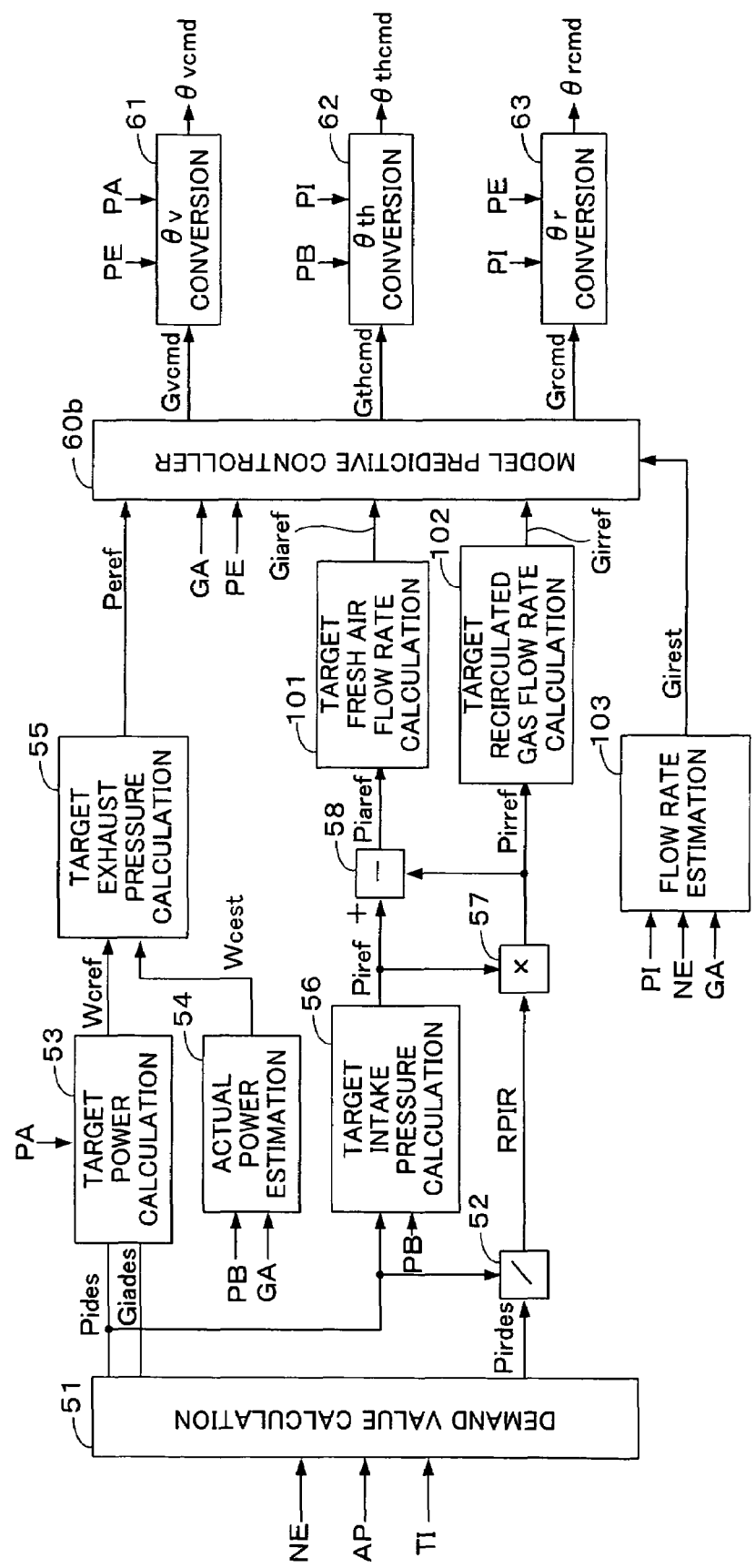
FIG. 9 is a block diagram illustrating a configuration of an intake and exhaust gas state control module according to a second modification of the first embodiment.

FIG. 9 is a block diagram showing a configuration of the intake and exhaust gas state control module in this embodiment.

The module shown in FIG. 9 is obtained by changing the model predictive controller 60 and the partial pressure estimation block 59, respectively, to a model predictive controller 60b and a flow rate estimation block 103, and adding a target fresh air flow rate calculation block 101 and a target recirculated gas flow rate calculating block 102. The detected fresh air flow rate GA is input to the model predictive controller 60b.

The target fresh air flow rate calculation block 101 multiplies the coefficient $k_{\eta v}$ applied to equation (26) and the target fresh air partial pressure Piaref to calculate a target fresh air flow rate Giaref. The target recirculated gas flow rate calculation block 102 multiplies the coefficient $k_{\eta v}$ and the target recirculated gas partial pressure Pirref to calculate a target recirculated gas flow rate Girref. The flow rate estimation block 103 retrieves a Gz map (not shown), which is set according to the engine rotational speed NE and the intake pressure PI, to calculate a flow rate (intake gas flow rate) Gz of gases supplied to the cylinder. The flow rate estimation block 103 subtracts the detected fresh air flow rate GA from the intake gas flow rate Gz to calculate an estimated recirculated gas flow rate Girest.

The model predictive controller 60b performs the model predictive control based on the above-described controlled object model to calculate the turbine gas flow rate command value Gvcmd, the fresh air flow rate command value Gthcmd, and the recirculated gas flow rate command value Grcmd so that the detected fresh air flow rate GA, the estimated recirculated gas flow rate Girest, and the detected exhaust pressure PE coincide, respectively, with the target fresh air flow rate Giaref, the target recirculated gas flow rate Girref, and the target exhaust pressure Peref.

In this embodiment, the demand value calculation block 51, the dividing block 52, the target intake pressure calculation block 56, the multiplying block 57, the subtracting block 58, the target fresh air flow rate calculation block 101, and the target recirculated gas flow rate calculation block 102 correspond to the second target value calculating means, and the model predictive controller 60b, the θv conversion block 61, the θth conversion block 62, and the θr conversion block 63 correspond to the gas control means.

Further, the fresh air flow rate Gia or the recirculated gas flow rate Gir used as the intake gas parameter may be replaced with the intake gas flow rate Gz(=Gia+Gir) which is a sum of the fresh air flow rate Gia and the recirculated gas flow rate Gir.

Figure 10:
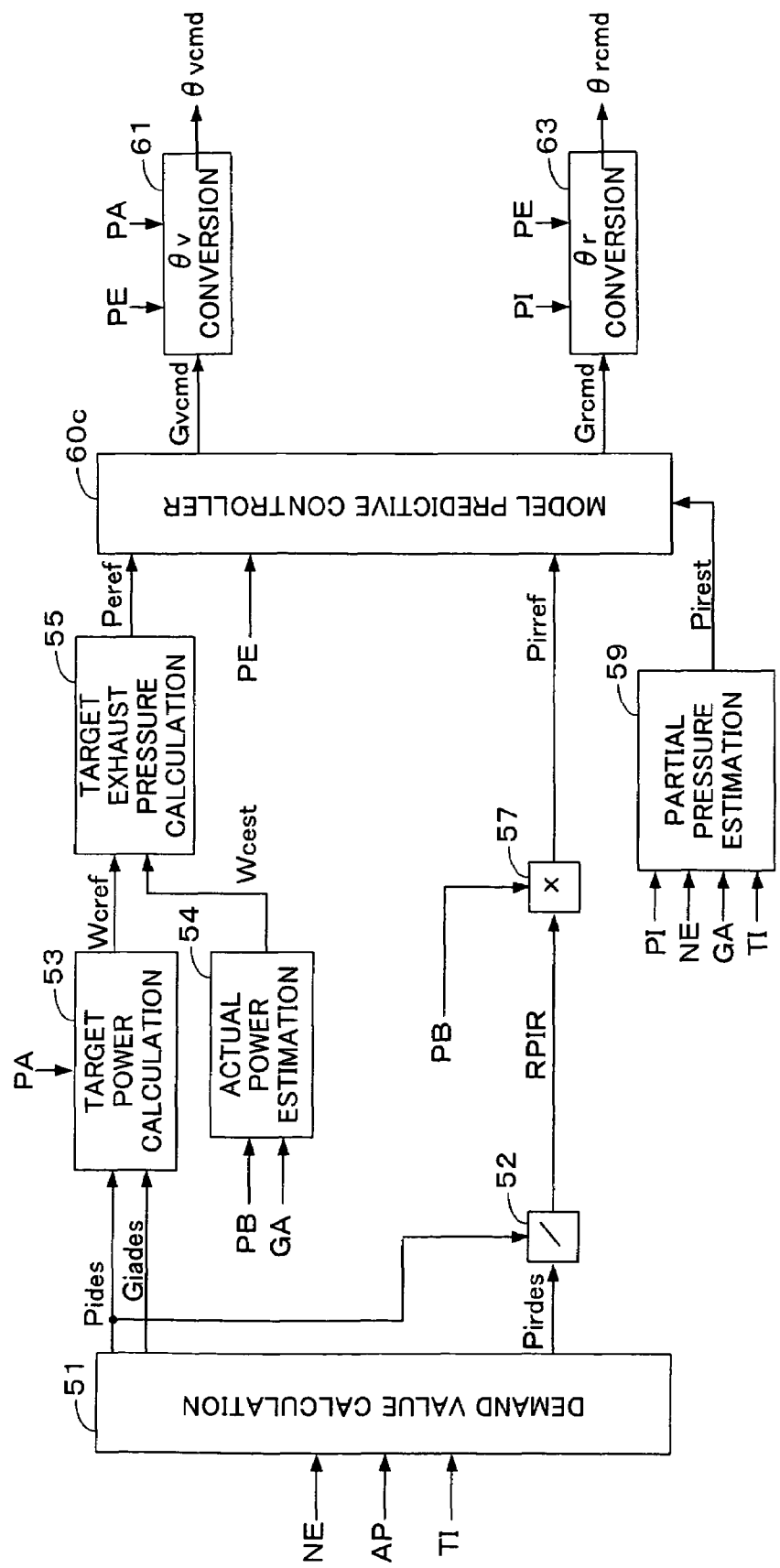
FIG. 10 is a block diagram illustrating a configuration of an intake and exhaust gas state control module according to a second embodiment of the present invention.

In the first embodiment, the controlled object is an engine having the throttle valve 3 in the intake pipe 2. In a second embodiment of the present invention, the controlled object is an engine having no throttle valve, and the intake and exhaust gas state control module is configured as shown in FIG. 10. This embodiment is the same as the first embodiment except for the points described below.

The intake and exhaust gas state control module shown in FIG. 10 is obtained by deleting the target intake pressure calculation block 56, the subtracting block 58, and the θth conversion block 62 in the intake and exhaust gas state control module shown in FIG. 2 and changing the model predictive controller 60 to the model predictive controller 60c. The detected boost pressure PB, instead of the target intake pressure Piref, is input to the multiplying block 57. Therefore, the multiplying block 57 multiplies the demand recirculated gas ratio RPIR and the boost pressure PB to calculate the target recirculated gas partial pressure Pirref.

The target exhaust pressure Peref, the detected exhaust pressure PE, the target recirculated gas partial pressure Pirref, and the estimated recirculated gas partial pressure Pirest are input to the model predictive controller 60c. That is, the target fresh air partial pressure Piaref and the estimated fresh air partial pressure Piaest are not input to the controller 60c.

The model predictive controller 60c calculates the turbine gas flow rate command value Gvcmd, which is a command value of the flow rate of gases passing through the turbine 11, and the recirculated gas flow rate command value Grcmd, which is a command value of the flow rate of recirculated gases passing through the EGR valve 6, using the model predictive control wherein the detected exhaust pressure PE and the estimated recirculated gas partial pressure Pirest coincide, respectively, with the target exhaust pressure Peref and the target recirculated gas partial pressure Pirref.

In this embodiment, the controlled object model is defined by equation (81) since no throttle valve is provided in the intake pipe 2.

$$\frac{d}{d\alpha}\begin{bmatrix} Pir \\ Pe \end{bmatrix} = \begin{bmatrix} a11 & a12 \\ a21 & a22 \end{bmatrix}\begin{bmatrix} Pir \\ Pe \end{bmatrix} + \begin{bmatrix} b11 & b12 \\ b21 & b22 \end{bmatrix}\begin{bmatrix} u_r \\ u_v \end{bmatrix} \quad (81)$$

$$\begin{bmatrix} u_r \\ u_v \end{bmatrix} = [Gr \ Gv]^T$$

where the model parameters a11-a22 and b11-b22 are previously and empirically set by the system identification.

By transforming equation (81) to an equation defining the controlled object model of the discrete time system using the discrete time k digitized with a sampling period h, each term of the equation (x(k+1)=Ax(k)+Bu(k)) defining the controlled object model is given by equations (82)-(85).

$$x(k) = \begin{bmatrix} Pir(k) \\ Pe(k) \end{bmatrix} \quad (82)$$

$$u(k) = \begin{bmatrix} Gr(k) \\ Gv(k) \end{bmatrix} \quad (83)$$

-continued $$A = \begin{bmatrix} 1 + h \cdot a11 & h \cdot a12 \\ h \cdot a21 & 1 + h \cdot a22 \end{bmatrix} \quad (84)$$

$$B = \begin{bmatrix} h \cdot b11 & h \cdot b12 \\ h \cdot b21 & h \cdot b22 \end{bmatrix} \quad (85)$$

The model predictive controller 60c performs the model predictive control based on this controlled object model. In this embodiment, the matrixes SQ and SR, which are necessary for calculating the optimal input change amount Δu(k) opt, are given by equations (86) and (87). The matrixes Ψ and Γ, which are necessary for calculating the matrix Θ, the tracking error ε(k) and the target value vector T(k), are given by the same equations as the above described equations (68)-(70). The setting value vector s(k) is given by equation (88), and the corresponding target value vector T(k) is given by equation (89).

$$SQ = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (86)$$

$$SR = \begin{bmatrix} 1 & 0 \\ 0 & 1 \end{bmatrix} \quad (87)$$

$$S(k) = \begin{bmatrix} Pirref(k) \\ Peref(k) \end{bmatrix} \quad (88)$$

$$T(k) = \begin{bmatrix} Pirref(k) - \lambda(Pirref(k) - Pirest(k)) \\ Peref(k) - \lambda(Peref(k) - PE(k)) \\ Pirref(k) - \lambda^2(Pirref(k) - Pirest(k)) \\ Peref(k) - \lambda^2(Peref(k) - PE(k)) \end{bmatrix} \quad (89)$$

The model predictive controller 60c operates similarly as the model predictive controller 60 except for the above-described differences.

According to this embodiment, the vane opening of the turbine 11 and the opening of the EGR valve 6 are controlled with the model predictive control wherein both the exhaust pressure PE and the estimated recirculated gas partial pressure Pirest coincide with the corresponding target values Peref and Pirref. Consequently, the state of gases supplied to the engine can optimally be controlled, maintaining the optimal state of exhaust gases.

In this embodiment, the demand value calculation block 51, the dividing block 52, and the multiplying block 57 correspond to the second target value calculating means, and the model predictive controller 60c and the θv conversion block 61 and the θr conversion block 63 correspond to the gas control means.

In a third embodiment of the present invention, the controlled object is the engine having the throttle valve 3 in the intake pipe 2, like the first embodiment. An oxygen partial pressure Pio on the downstream side of the throttle valve 3 in the intake pipe and the intake pressure Pi are used as the intake pipe gas parameters.

Figure 11:
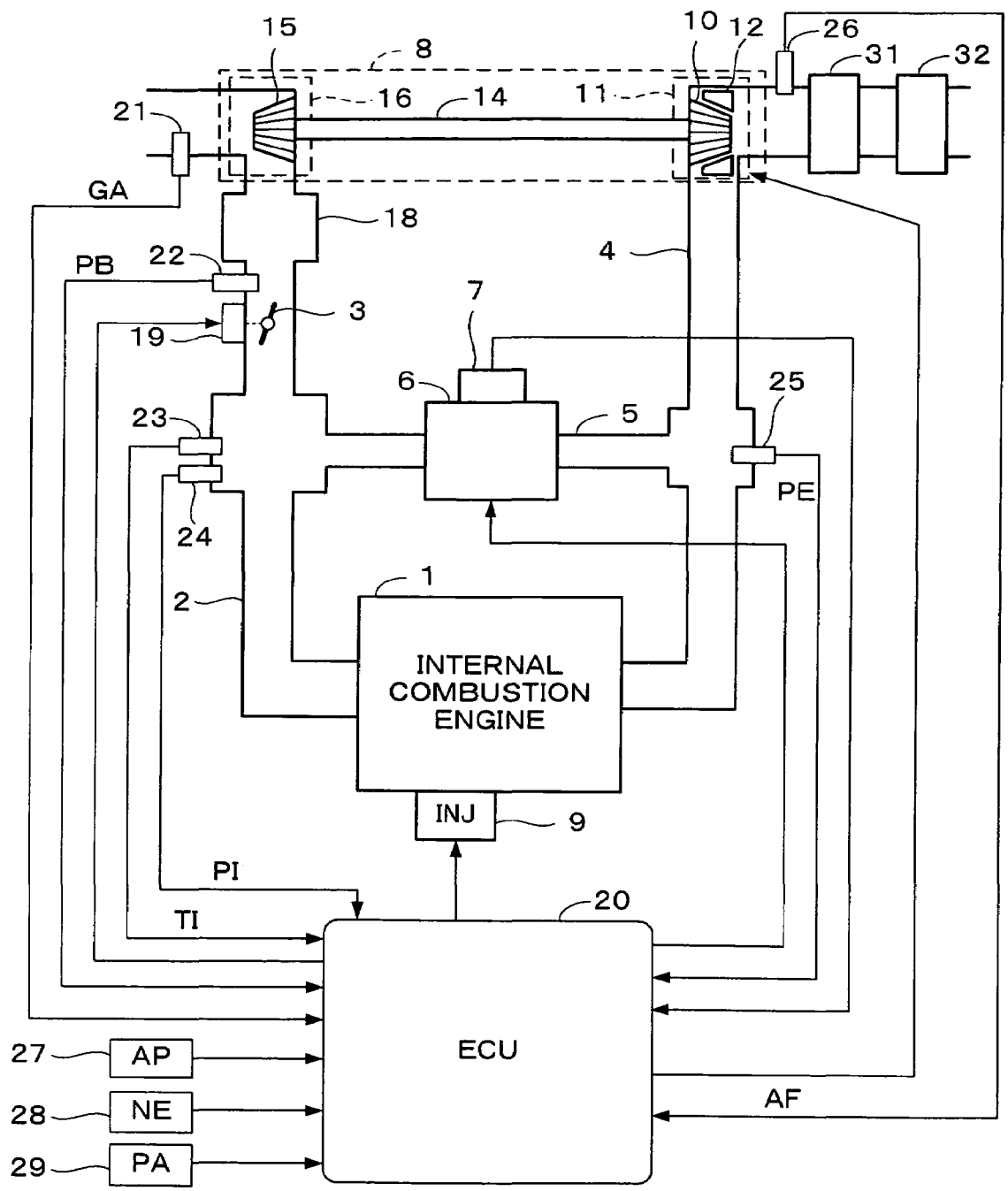
FIG. 11 illustrates a configuration of an internal combustion engine and a control system therefor according to a third embodiment of the present invention.

In this embodiment, FIG. 11 shows a configuration of the engine and the control system therefor. An air-fuel ratio sensor 26 is disposed upstream of the catalytic converter 31 in the exhaust pipe 4. The air-fuel ratio sensor 26 supplies a signal to the ECU 20 indicating an air-fuel ratio AF in the combustion chamber of the engine 1. Except for this point, the configuration of FIG. 11 is the same as that of FIG. 1.

Figure 12:
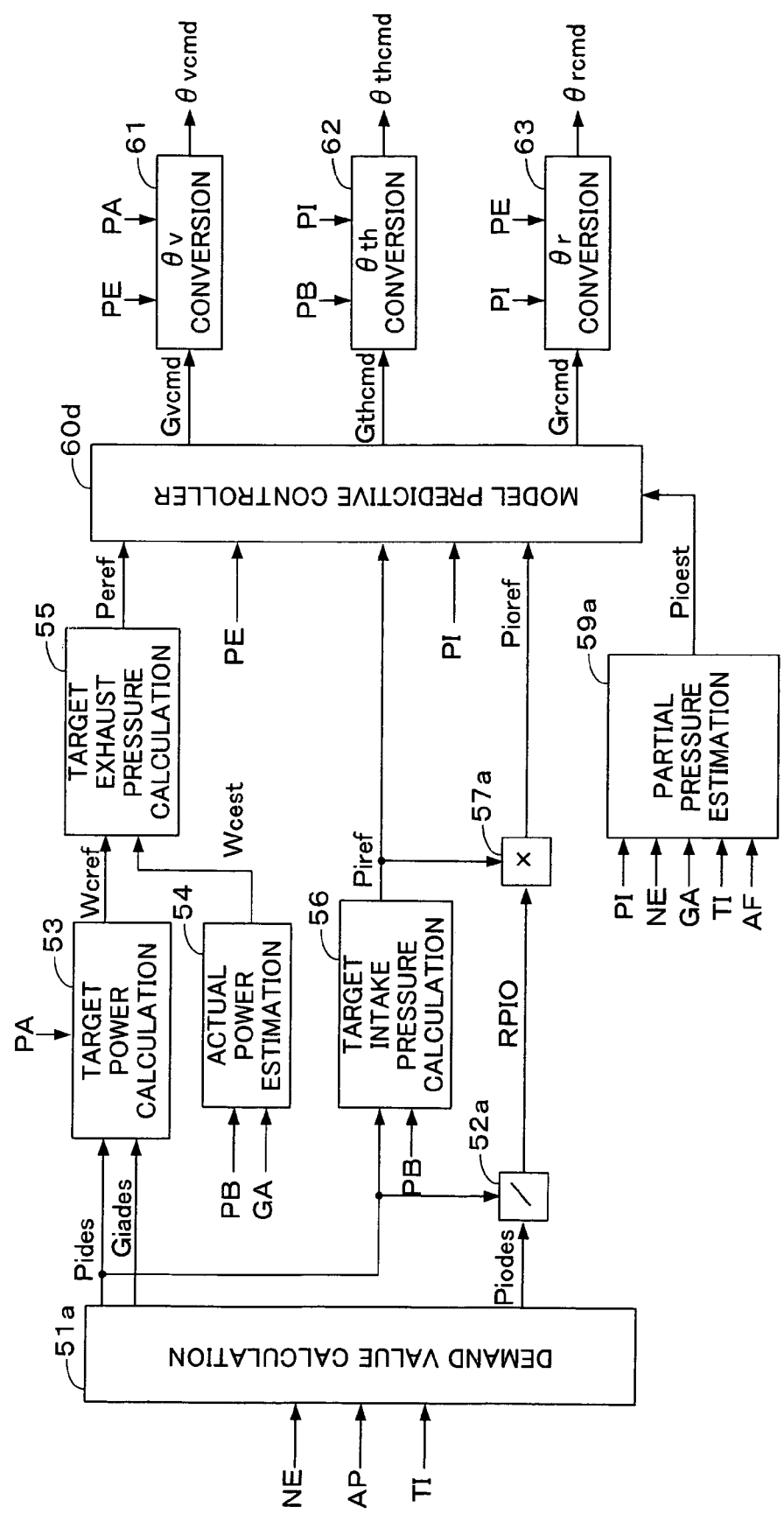
FIG. 12 is a block diagram illustrating a configuration of a module which performs an intake and exhaust gas state control of the internal combustion engine shown in FIG. 11.

FIG. 12 is a block diagram showing a configuration of an intake and exhaust gas state control module in this embodiment. In the module shown in FIG. 12, the demand value calculation block 51, the multiplying blocks 52 and 57, the partial pressure estimation block 59, and the model predictive controller 60 of FIG. 2 are changed, respectively, to a demand value calculation block 51a, multiplying blocks 52a and 57a, a partial pressure estimation block 59a, and a model predictive controller 60d, and the subtracting block 58 is deleted.

Figure 13:
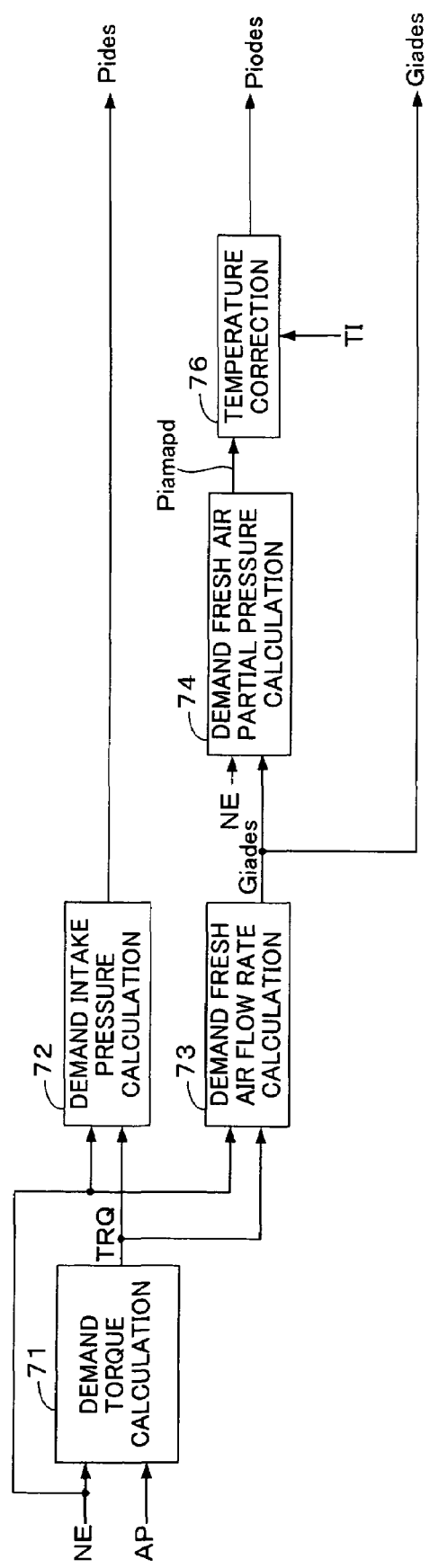
FIG. 13 is a block diagram illustrating a configuration of a demand value calculation block shown in FIG. 12.

FIG. 13 is a block diagram showing a configuration of the demand value calculation block 51a. The demand value calculation block 51a is obtained by changing the demand fresh air partial pressure calculation block 74 and the temperature correction block 76 in the demand value calculation block 51 shown in FIG. 3, respectively, to a demand oxygen partial pressure calculation block 74a and the temperature correction block 76a and deleting the subtracting block 77.

The demand oxygen partial pressure calculation block 74a retrieves a Pio map according to the engine rotational speed NE and the demand fresh air flow rate Giades to calculate a demand oxygen partial pressure map value Piomapd. The demand oxygen partial pressure is a desired value of the oxygen partial pressure in the gases supplied to the engine 1. The Pio map is set corresponding to the state where the intake air temperature TI is equal to the predetermined temperature TINOR.

The temperature correction block 76a applies the detected intake air temperature TI to equation (2a) to correct the demand oxygen partial pressure map value Piomapd and calculate a demand oxygen partial pressure Piodes.

$$Piodes=(TI/TINOR)Piomapd \quad (2a)$$

Referring to FIG. 12, the dividing block 52a divides the demand oxygen partial pressure Piodes by the demand intake pressure Pides to calculate a demand oxygen partial pressure ratio RPIO. The multiplying block 57a multiplies the target intake pressure Piref and the demand oxygen partial pressure ratio RPIO to calculate the target oxygen partial pressure Pioref. The target intake pressure Piref output from the target intake pressure calculation block 56 is directly input to the model predictive controller 60d.

Figure 14:
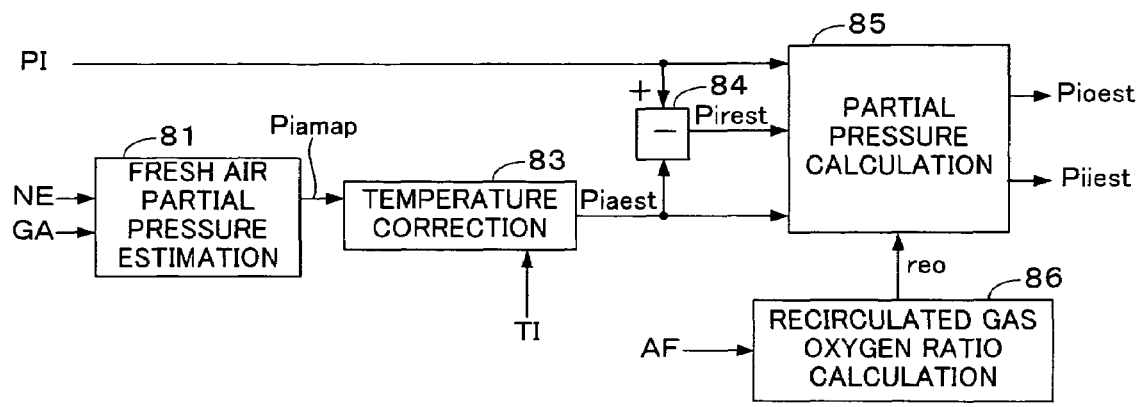
FIG. 14 is a block diagram illustrating a configuration of a partial pressure estimation block shown in FIG. 12.

FIG. 14 is a block diagram showing a configuration of the partial pressure estimation block 59a. The partial pressure estimation block 59a is obtained by adding a partial pressure calculation block 85 and a recirculated gas oxygen ratio calculation block 86 to the partial pressure estimation block 59 shown in FIG. 4.

The recirculated gas oxygen ratio calculation block 86 converts the air-fuel ratio AF detected by the air-fuel ratio sensor 26 to the oxygen ratio rexo in the exhaust gases (hereinafter referred to as "exhaust gas oxygen ratio") using a characteristic conversion table. Further, the exhaust gas oxygen ratio rexo is subjected to a dynamic behavior compensation with respect to the recirculated gas flow from the exhaust pipe 4 to the intake pipe 2 to calculate a recirculated gas oxygen ratio reo. The dynamic behavior compensation with respect to the recirculated gas flow is performed, for example, by giving a dead time period and the first order delay characteristic to the exhaust gas oxygen ratio rexo.

The partial pressure calculation block 85 applies the estimated fresh air partial pressure Piaest, the estimated recirculated gas partial pressure Pirest, and the recirculated gas oxygen ratio reo to equation (101) to calculate an estimated oxygen partial pressure Pioest. Further, the partial pressure calculation block 85 applies the detected intake pressure PI and the estimated oxygen partial pressure Pioest calculated by equation (101) to equation (102) to calculate an estimated inert gas partial pressure Piiest. In equation (101), "rao" is an oxygen ratio in the air (0.232, hereinafter referred to as "air oxygen ratio").

$$Pioest=rao\cdot Piaest+reo\cdot Pirest \quad (101)$$

$$Piiest=PI-Pioest \quad (102)$$

The detected intake pressure PI is input to the model predictive controller 60d. The partial pressure estimation block 59a inputs only the estimated oxygen partial pressure Pioest to the model predictive controller 60d. The model predictive controller 60d performs the model predictive control based on the controlled object model which is obtained using the intake pressure Pi and the oxygen partial pressure Pio instead of the fresh air partial pressure Pia and the recirculated gas partial pressure Pir in the first embodiment. That is, the model predictive controller 60d calculates the turbine gas flow rate command value Gvcmd, the fresh air flow rate command value Gthcmd, and the recirculated gas flow rate command value Grcmd so that the detected intake pressure PI, the estimated oxygen partial pressure Pioest, and the detected exhaust pressure PE coincide, respectively, with the target intake pressure Piref, the target oxygen partial pressure Pioref, and the target exhaust pressure Peref.

Next, the controlled object model in this embodiment is described below.

Regarding the intake pressure PI, equation (111) is satisfied. Since the intake gas flow rate G'z can be expressed by equation (24) (shown again), equation (112) is obtained by applying equation (24) to equation (111).

$$\frac{d}{dt}Pi = ki(G'th + G'r - G'z) \quad (111)$$

$$G'z = k'_{\eta v} \times Pi \quad (24)$$

$$\frac{d}{dt}Pi = -k'_{\eta v}ki \cdot Pi + ki(G'th + G'r) \quad (112)$$

Regarding the intake oxygen partial pressure Pio, equation (113) is satisfied. In equation (113), "Mio" is a mass of the oxygen in the intake pipe.

$$Pio \cdot Vi = Mio \cdot R \cdot Ti \quad (113)$$

By differentiating equation (113) with respect to time, equation (114) is obtained. Further, if using the air oxygen ratio rao and the recirculated gas oxygen ratio reo, equation (115) is satisfied.

$$\frac{dPio}{dt} = \kappa ni \frac{RTi}{Vi} \frac{dMio}{dt} \quad (114)$$

$$\frac{dMio}{dt} = rao \cdot G'th + reo \cdot G'r - \frac{Pio}{Pi} \cdot G'z \quad (115)$$

By applying equations (115) and (24) to equation (114), equation (116) is obtained.

$$\frac{d}{dt}Pio = -k'_{\eta v}ki \cdot Pio + ki(rao \cdot G'th + reo \cdot G'r) \quad (116)$$

Regarding the exhaust pressure Pe, equation (28) (shown again) is satisfied. By applying equation (24) to equation (28), equation (117) is obtained.

$$\frac{d}{dt}Pe = ke(G'z - G'r - G'v)\left(ke = \kappa ne\frac{RTe}{Ve}\right) \quad (28)$$

$$\frac{d}{dt}Pe = k'_{\eta v}ke \cdot Pi - ke(G'r + G'v) \quad (117)$$

By combining equations (112), (116), and (117), and converting the combined equation to an equation based on the crank angle α, equation (118), which defines the controlled object model, is obtained. Therefore, the control input u(k) can be calculated based on equation (118) with the same method as the above-described first embodiment.

$$\frac{d}{d\alpha}\begin{bmatrix} Pi \\ Pio \\ Pe \end{bmatrix} = \begin{bmatrix} -k_{\eta v}ki & 0 & 0 \\ 0 & -k_{\eta v}ki & 0 \\ k_{\eta v}ke & 0 & 0 \end{bmatrix}\begin{bmatrix} Pi \\ Pio \\ Pe \end{bmatrix} + \begin{bmatrix} ki & ki & 0 \\ ki \cdot rao & ki \cdot reo & 0 \\ 0 & -ke & -ke \end{bmatrix}\begin{bmatrix} u_{th} \\ u_r \\ u_v \end{bmatrix}\begin{bmatrix} u_{th} \\ u_r \\ u_v \end{bmatrix} [Gth \ Gr \ Gv]^T \quad (118)$$

Figure 15:
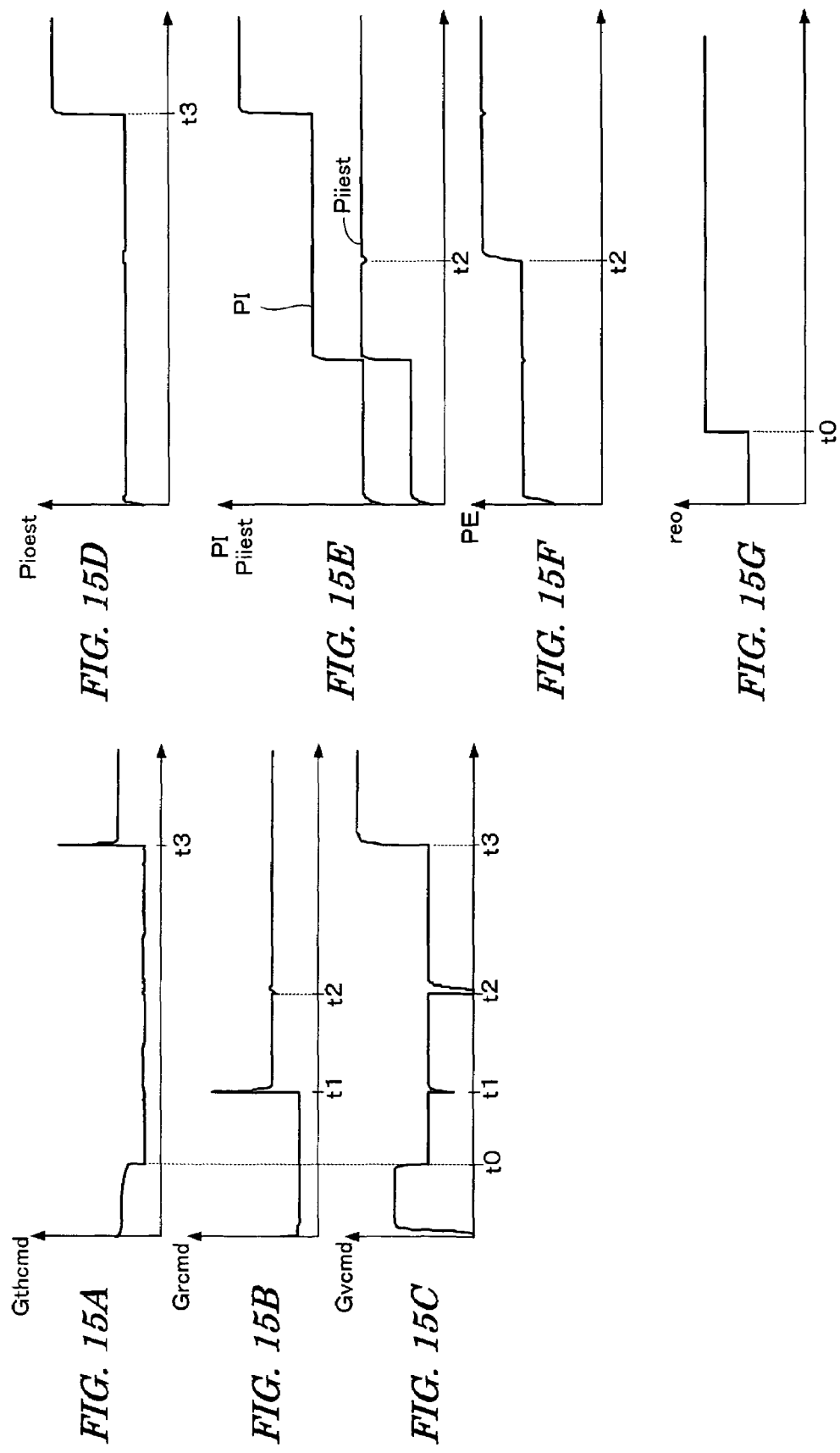
FIGS. 15A-15G are time charts explaining an example of a control operation.

FIGS. 15A-15G show time charts explaining an example of the control operation in this embodiment. FIGS. 15A-15C show changes in the control input u(k), i.e., Gthcmd(k), Grcmd(k), and Gvcmd(k). FIGS. 15D-15F show changes in the corresponding control output x(k), i.e., Pioest, PI, and PE. Further, FIG. 15G shows changes in the recirculated gas oxygen ratio reo. In addition, changes in the estimated inert gas partial pressure Piiest are also shown in FIG. 15E.

At time t0, the recirculated gas oxygen ratio reo increases, and then the throttle valve 3 is closed to maintain the oxygen partial pressure Pioest at a constant level (FIG. 15A). At the same time, the vane opening is controlled to change in the closing direction to maintain the exhaust pressure PE at a constant level (FIG. 15C). At time ti, the EGR valve 6 is opened to raise the inert gas partial pressure Pii in the intake pipe, and at the same time, the vane opening of the turbine 11 is controlled to slightly change a little in the closing direction to maintain the exhaust pressure PE at a constant level. At time t2, the vane opening is controlled to change in the closing direction to raise the exhaust pressure PE, and the opening of the EGR valve 6 is controlled to slightly change in the closing direction to maintain the oxygen partial pressure Pioest at a constant level. Further, at time t3, the throttle valve 3 is opened to increase the oxygen partial pressure Pioest, and at the same time, the vane opening is controlled to change in the opening direction to maintain the exhaust pressure PE at a constant level.

As described above, according to this embodiment, the intake pressure PI and the oxygen partial pressure Pio in the intake pipe and the exhaust pressure PE, which are the gas parameters relevant to each other, can independently be converged to the corresponding target values. Therefore, the gas parameters can appropriately be controlled according to the operating condition of the engine 1, thereby obtaining maximum engine 1 performance.

In this embodiment, the intake pressure Pi and the oxygen partial pressure Pio correspond to the intake pipe gas parameters, and the air-fuel ratio sensor 26 forms a part of the intake gas parameter obtaining means. The demand value calculation block 51a, the target power value calculation block 53, the actual power estimation block 54, and the target exhaust pressure calculation block 55 correspond to the first target value calculating means. The demand value calculation block 51a, the dividing block 52a, the target intake pressure calculation block 56, and the multiplying block 57a correspond to the second target value calculating means. The model predictive controller 60d, the θv conversion block 61, the θth conversion block 62, and the θr conversion block 63 correpond to the gas control means. The demand value calculation block 51a corresponds to the steady state target value calculating means.

In the third embodiment described above, the intake pressure Pi and the oxygen partial pressure Pio are used as the intake pipe gas parameters. Alternatively, in a modification of the third embodiment, the intake pressure Pi may be replaced with the inert gas partial pressure Pii (=Pi−Pio). In such case, the intake and exhaust gas state control module is configured as shown in FIG. 16.

Figure 16:
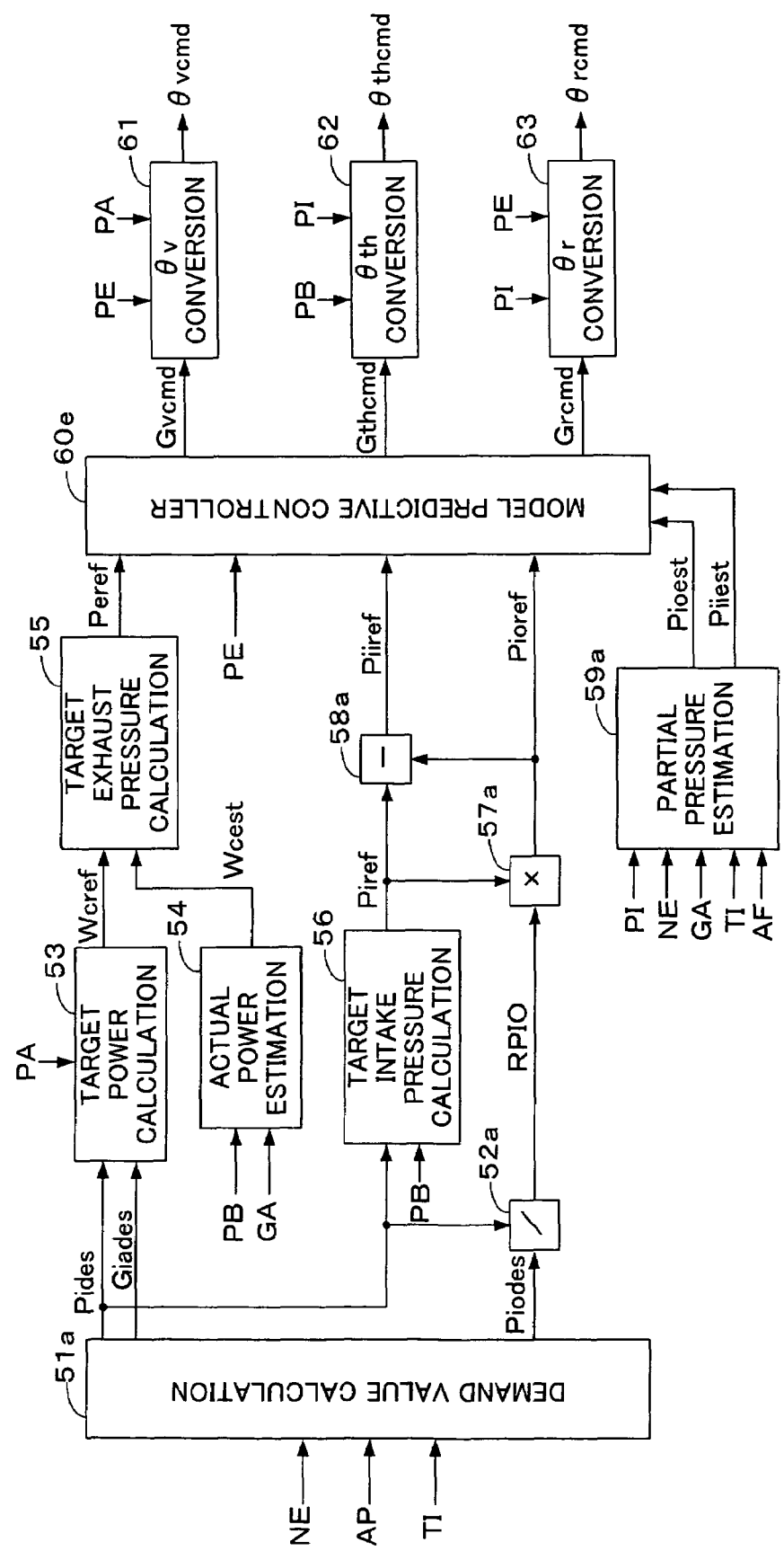
FIG. 16 is a block diagram illustrating a configuration of an intake and exhaust gas state control module according to a first modification of the third embodiment.

The intake and exhaust gas state control module shown in FIG. 16 is obtained by adding a subtracting block 58a to the intake and exhaust gas state control module shown in FIG. 12, and changing the model predictive controller 60d to a model predictive controller 60e.

The subtracting block 58a subtracts the target oxygen partial pressure Pioref from the target intake pressure Piref to calculate a target inert gas partial pressure Piiref. The partial pressure estimation block 59a inputs the estimated oxygen partial pressure Pioest and the estimated inert gas partial pressure Piiest to the model predictive controller 60e. The detected intake pressure PI is not input to the model predictive controller 60e.

The model predictive controller 60e performs the model predictive control based on the controlled object model which is obtained using the inert gas partial pressure Pii instead of the intake pressure Pi in the above-described embodiment. That is, the model predictive controller 60e calculates the turbine gas flow rate command value Gvcmd, the fresh air flow rate command value Gthcmd, and the recirculated gas flow rate command value Grcmd so that the estimated oxygen partial pressure Pioest, the estimated inert gas partial pressure Piiest, and the detected exhaust pressure PE coincide, respectively, with the target oxygen partial pressure Pioref, the target inert gas partial pressure Piiref, and the target exhaust pressure Peref.

Next, the controlled object model in this embodiment is described below. The intake pressure Pi can be expressed as a sum of the oxygen partial pressure Pio and the inert gas partial pressure Pii as shown in equation (120). Accordingly, equation (121) is obtained from equation (112).

$$Pi = Pio + Pii \quad (120)$$

$$\frac{d}{dt}(Pio + Pii) = -k'_{\eta v}ki \cdot (Pio + Pii) + ki(G'th + G'r) \quad (121)$$

By applying the relationship of equation (116) to equation (121), equation (122) is obtained. In equation (122), (1-rao) and (1-reo) correspond, respectively, to an inert gas ratio in the air and an inert gas ratio in the exhaust gases. If (1-rao) and (1-reo) are respectively expressed as "rai" and "rei", equation (123) is obtained.

$$\frac{d}{dt} Pii = -k'_{\eta v} ki \cdot Pii + ki\{(1-rao) \cdot G'th + (1-reo) \cdot G'r\} \quad (122)$$

$$\frac{d}{dt} Pii = -k'_{\eta v} ki \cdot Pii + ki(rai \cdot G'th + rei \cdot G'r) \quad (123)$$

Further, by applying the relationship of equation (120) to equation (117), equation (124) is obtained.

$$\frac{d}{dt} Pe = k'_{\eta v} ke \cdot Pio + k'_{\eta v} ke \cdot Pii - ke(G'r + G'v) \quad (124)$$

By combining equations (116), (123), and (124), and converting the combined equation to an equation based on the crank angle α, equation (125) is obtained. Therefore, the control input u(k) can be calculated based on equation (125) with the same method as the above-described first embodiment.

$$\frac{d}{d\alpha}\begin{bmatrix} Pio \\ Pii \\ Pe \end{bmatrix} = \begin{bmatrix} -k_{\eta v}ki & 0 & 0 \\ 0 & -k_{\eta v}ki & 0 \\ k_{\eta v}ke & -k_{\eta v}ke & 0 \end{bmatrix} \begin{bmatrix} Pio \\ Pii \\ Pe \end{bmatrix} + \begin{bmatrix} ki \cdot rao & ki \cdot reo & 0 \\ ki \cdot rai & ki \cdot rei & 0 \\ 0 & -ke & -ke \end{bmatrix}\begin{bmatrix} u_{th} \\ u_r \\ u_v \end{bmatrix}\begin{bmatrix} u_{th} \\ u_r \\ u_v \end{bmatrix} = \quad (125)$$

$$[\,Gth \quad Gr \quad Gv\,]^T$$

In yet another modification of the third embodiment, an oxygen flow rate Gio and an inert gas flow rate Gii may be used as the intake pipe gas parameters instead of the oxygen partial pressure Pio and the inert gas partial pressure Pii. The controlled object model in such case is described below.

With respect to the oxygen partial pressure Pio in the intake pipe 2, the relationship of equation (131) is satisfied using the air oxygen ratio rao and the recirculated gas oxygen ratio reo. Equation (131) is converted to equation (132) using the time k digitized with a sampling period h.

$$\frac{d}{dt} Pio = ki\left(rao \cdot G'th + reo \cdot G'r - \frac{Pio}{Pi}G'z\right) \quad (131)$$

$$Pio(k+1) = Pio(k) + hki\left\{rao \cdot G'th(k) + reo \cdot G'r(k) - \frac{Pio(k)}{Pi(k)}G'z(k)\right\} \quad (132)$$

By transforming equation (132) using the relationship of equation (133), equation (134) is obtained.

$$G'io(k) = \frac{Pio(k)}{Pi(k)} G'z(k) \quad (133)$$

$$Pio(k+1) = Pio(k) + hki(rao \cdot G'th(k) + reo \cdot G'r(k) - G'io(k)) \quad (134)$$

On the other hand, by applying the relationship of equation (24) to the oxygen flow rate G'io, equation (135) is obtained, and equation (136) is obtained from equation (135).

$$G'io = k'_{\eta v} \cdot Pio(k) \quad (135)$$

$$Pio(k) = \frac{G'io(k)}{k'_{\eta v}} \quad (136)$$

By applying equation (136) to equation (134), equation (137) is obtained. Similarly, equation (138) is obtained with respect to the inert gas flow rate G'ii.

$$G'io(k+1) = G'io(k) + k'_{\eta v} hki(rao \cdot G'th(k) + reo \cdot G'r(k) - G'io(k))$$

$$G'io(k+1) = (1 - hk'_{\eta v}ki)G'io(k) + hk'_{\eta v}ki \cdot rao\, G'th(k) + hk'_{\eta v}ki \cdot reo \cdot G'r(k) \quad (137)$$

$$G'ii(k+1) = (1 - hk'_{\eta v}ki)G'ii(k) + hk'_{\eta v}ki \cdot rai \cdot G'th(k) + hk'_{\eta v}ki \cdot rei \cdot G'r(k) \quad (138)$$

Accordingly, each term of the equation (x(k+1)=Ax(k)+Bu(k)) defining the model of the discrete time period system is given by equations (139)-(142).

$$x(k) = \begin{bmatrix} Gio(k) \\ Gii(k) \\ Pe(k) \end{bmatrix} \quad (139)$$

$$u(k) = \begin{bmatrix} Gth(k) \\ Gr(k) \\ Gv(k) \end{bmatrix} \quad (140)$$

$$A = \begin{bmatrix} 1 - hk_{\eta v}ki & 0 & 0 \\ 0 & 1 - hk_{\eta v}ki & 0 \\ hk_{\eta v}ke & hk_{\eta v}ke & 1 \end{bmatrix} \quad (141)$$

$$B = \begin{bmatrix} hk_{\eta v}ki \cdot rao & hk_{\eta v}ki \cdot reo & 0 \\ hk_{\eta v}ki \cdot rai & hk_{\eta v}ki \cdot rei & 0 \\ 0 & -hke & -hke \end{bmatrix} \quad (142)$$

Figure 17:
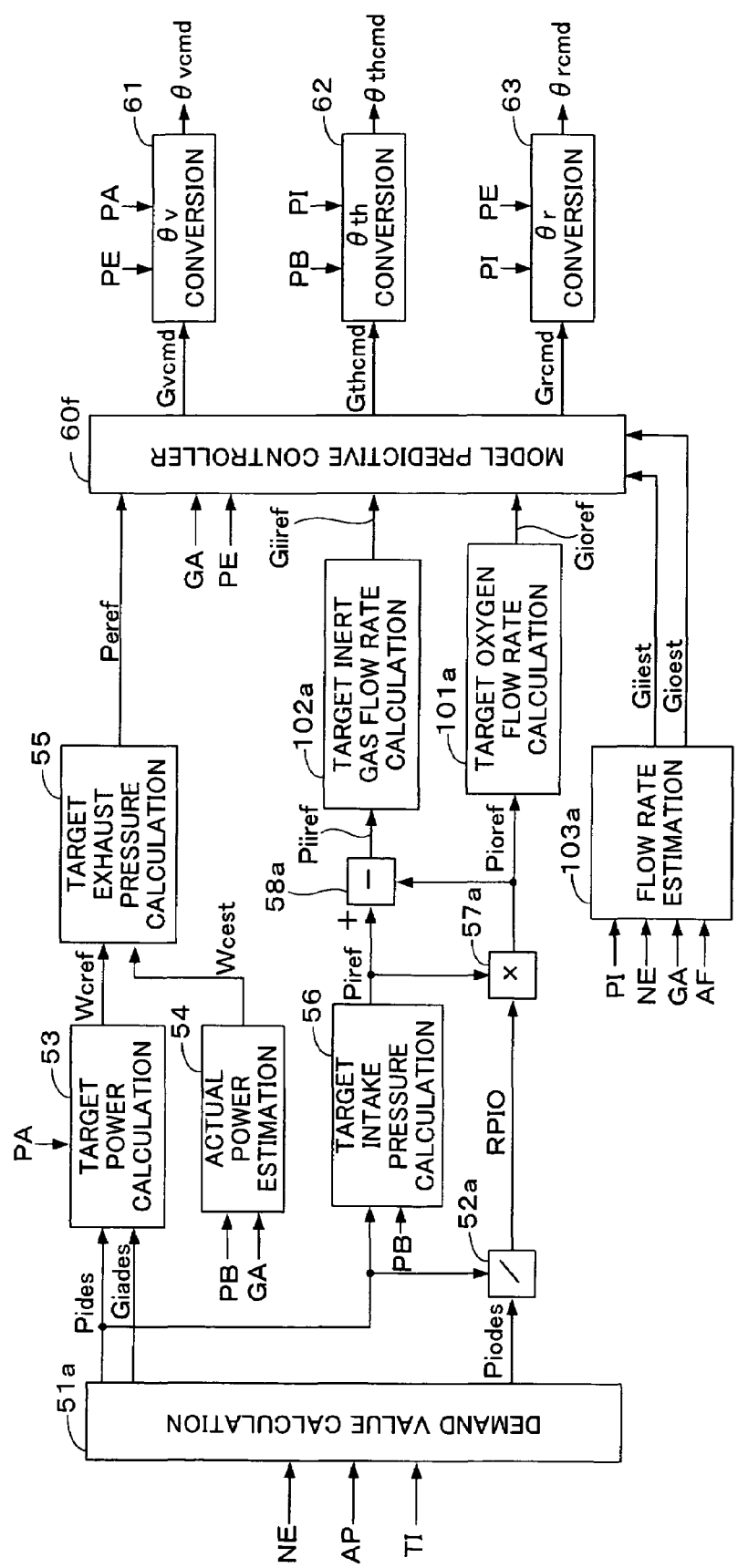
FIG. 17 is a block diagram illustrating a configuration of an intake and exhaust gas state control module according to a second modification of the third embodiment.

FIG. 17 is a block diagram showing a configuration of the intake and exhaust gas state control module in this modification.

The module of FIG. 17 is obtained by changing the model predictive controller 60*d* and the partial pressure estimation block 59*a* in the module of FIG. 12, respectively, to a model predictive controller 60*f* and a flow rate estimation block 103*a*, and adding a target oxygen flow rate calculation block 101*a* and a target inert gas flow rate calculation block 102*a*.

The target oxygen flow rate calculation block 101*a* multiplies the target oxygen partial pressure Pioref and the coefficient $k_{\eta v}$ applied to equation (26) to calculate a target oxygen flow rate Gioref. The target inert gas flow rate calculation block 102*a* multiplies the target inert gas partial pressure Piiref and the coefficient $k_{\eta v}$ to calculate a target inert gas flow rate Giiref. The flow rate estimation block 103a includes a partial pressure estimation block 59a and a conversion block (not shown) which converts the estimated oxygen partial pressure Pioest and the estimated inert gas partial pressure Piiest to an estimated oxygen flow rate Gioest and an estimated inert gas flow rate Giiest. The conversion block multiplies the coefficient $k_{\eta v}$ applied to equation (26), respectively, by the estimated oxygen partial pressure Pioest and the estimated inert gas partial pressure Piiest to calculate the estimated oxygen flow rate Gioest and the estimated inert gas flow rate Giiest.

The model predictive controller 60f calculates the turbine gas flow rate command value Gvcmd, the fresh air flow rate command value Gthcmd, and the recirculated gas flow rate command value Grcmd so that the estimated oxygen flow rate Gioest, the estimated inert gas flow rate Giiest, and the detected exhaust pressure PE coincide, respectively, with the target oxygen flow rate Gioref, the target inert gas flow rate Giiref, and the target exhaust pressure Peref.

In this embodiment, the demand value calculation block 51a, the dividing block 52a, the target intake pressure calculation block 56, the multiplying block 57a, the subtracting block 58a, the target oxygen flow rate calculation block 101a, and the target inert gas flow rate calculation block 102a correspond to the second target value calculating means. The model predictive controller 60f, the θv conversion block 61, the θth conversion block 62, and the θr conversion block 63 correspond to the gas control means.

Either the oxygen flow rate Gio or the inert gas flow rate Gii, used as the intake pipe gas parameter, may be replaced with the intake gas flow rate Gz (=Gio+Gii) which is a sum of the oxygen flow rate Gio and the inert gas flow rate Gii.

Figure 18:
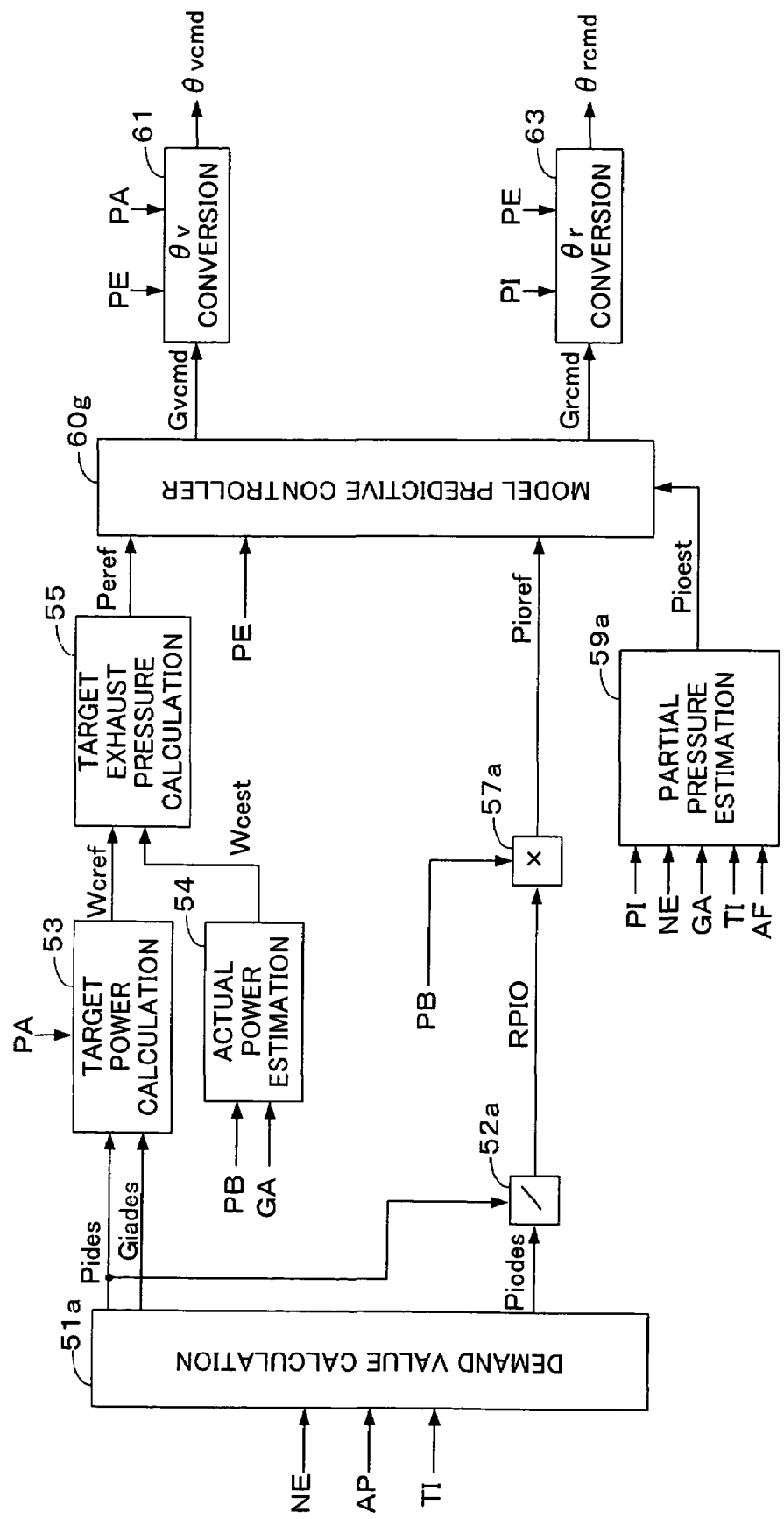
FIG. 18 is a block diagram illustrating a configuration of an intake and exhaust gas state control module according to a fourth embodiment of the present invention.

In a fourth embodiment of the present invention, the controlled object is an engine having no throttle valve, like the second embodiment. The intake and exhaust gas state control module in this embodiment is configured as shown in FIG. 18. Except for the points described below, the fourth embodiment is the same as the third embodiment.

The intake and exhaust gas state control module shown in FIG. 18 is obtained by deleting the target intake pressure calculation block 56 and the θth conversion block 62 of the intake and exhaust gas state control module shown in FIG. 12, and replacing the model predictive controller 60d with a model predictive controller 60g. Further, the detected boost pressure PB, instead of the target intake pressure Piref, is input to the multiplying block 57a. Therefore, the multiplying block 57a multiplies the demand oxygen partial pressure ratio RPIO and the boost pressure PB to calculate the target oxygen partial pressure Pioref.

The target exhaust pressure Peref, the detected exhaust pressure PE, the target oxygen partial pressure Pioref, and the estimated oxygen partial pressure Pioest are input to the model predictive controller 60g. That is, the detected intake pressure PI and the target intake pressure Piref are not input to the model predictive controller 60g.

The model predictive controller 60g calculates the turbine gas flow rate command value Gvcmd, which is a command value of the flow rate of gases passing through the turbine 11, and the recirculated gas flow rate command value Grcmd, which is a command value of the flow rate of recirculated gases passing through the EGR valve 6, using the model predictive control so that the detected exhaust pressure PE and the estimated oxygen partial pressure Pioest coincide, respectively, with the target exhaust pressure Peref and the target oxygen partial pressure Pioref.

In this embodiment, the controlled object model is defined by equation (151) since the engine has no throttle valve.

$$\frac{d}{d\alpha}\begin{bmatrix} Pio \\ Pe \end{bmatrix} = \begin{bmatrix} c11 & c12 \\ c21 & c22 \end{bmatrix}\begin{bmatrix} Pio \\ Pe \end{bmatrix} + \begin{bmatrix} d11 & d12 \\ d21 & d22 \end{bmatrix}\begin{bmatrix} u_r \\ u_v \end{bmatrix} \quad (151)$$

$$\begin{bmatrix} u_r \\ u_v \end{bmatrix} = [\,Gr \quad Gv\,]^T$$

where the model parameters c11-c22 and d11-d22 are previously and empirically set by the system identification.

By transforming equation (151) to an equation defining the controlled object model of the discrete time system using the discrete time k digitized with a sampling period h, each term of the equation (x(k+1)=Ax(k)+Bu(k)) defining the controlled object model is given by equations (152)-(155).

$$x(k) = \begin{bmatrix} Pio(k) \\ Pe(k) \end{bmatrix} \quad (152)$$

$$u(k) = \begin{bmatrix} Gr(k) \\ Gv(k) \end{bmatrix} \quad (153)$$

$$A = \begin{bmatrix} 1+h\cdot c11 & h\cdot c12 \\ h\cdot c21 & 1+h\cdot c22 \end{bmatrix} \quad (154)$$

$$B = \begin{bmatrix} h\cdot d11 & h\cdot d12 \\ h\cdot d2 & h\cdot d22 \end{bmatrix} \quad (155)$$

The model predictive controller 60c performs the model predictive control based on this controlled object model. The control operation is performed similarly as the second embodiment since the equation defining the controlled object model is obtained.

According to this embodiment, the vane opening of the turbine 11 and the opening of the EGR valve 6 are controlled with the model predictive control wherein both the exhaust pressure PE and the estimated oxygen partial pressure Pioest coincide with the corresponding target values Peref and Pioref. Consequently, the state of gases supplied to the engine can optimally be controlled, maintaining the optimal state of exhaust gases.

In this embodiment, the demand value calculation block 51a, the dividing block 52a, and the multiplying block 57a correspond to the second target value calculating means. The model predictive controller 60g, the θv conversion block 61 and the θr conversion block 63 correspond to the gas control means.

The present invention is not limited to the embodiments described above, and various modifications may be made. For example, in the second embodiment, the recirculated gas partial pressure Pir is used. Alternatively, the fresh air partial pressure Pia may be used instead of the recirculated gas partial pressure Pir. Further, either the recirculated gas flow rate Gir or the fresh air flow rate Gia may be used instead of the recirculated gas partial pressure Pir. Further, in the fourth embodiment, the oxygen partial pressure Pio is used as the intake pipe gas parameter. Alternatively, the inert gas partial pressure Pii may be used instead of the oxygen partial pressure Pio. Further, either the oxygen flow rate Gio or the inert gas flow rate Gii may be used instead of the oxygen partial pressure Pio.

In the above-described embodiments, the detected intake air temperature TI is used in the temperature correction blocks 76 and 83 shown in FIGS. 3 and 4. Alternatively, the intake air temperature estimated according to the engine rotational speed NE and the intake air flow rate GA (or the demand fresh air flow rate Giades) may be used instead of the detected intake air temperature.

In the above-described embodiments, examples are shown wherein the present invention is applied to control an internal combustion engine provided with a turbocharger having movable vanes. The present invention is applicable also to control systems of the following configurations.

A control system including a turbocharger of fixed displacement (a turbocharger having no movable vane), a bypass passage bypassing the turbine of the turbocharger, and a waste gate valve disposed in the bypass passage, wherein the amount of exhaust gases flowing into the turbine is changed by changing the opening of the waste gate valve to control the boost pressure. In this control system, the bypass passage and the waste gate valve correspond to the exhaust gas flow rate changing means.

A control system including a turbocharger of fixed displacement (a turbocharger having no movable vane), wherein the boost pressure is controlled by changing the amount of exhaust gases from the internal combustion engine according to the engine operating condition (e.g., the engine rotational speed and the target fuel supply amount). In this control system, the control unit that controls the amount of exhaust gases corresponds to the exhaust gas flow rate changing means.

In the above-described embodiments, examples are shown wherein the present invention is applied to the gas parameter control of a diesel internal combustion engine. The present invention is also applicable to the gas parameter control of a gasoline internal combustion engine.

The present invention can also be applied to a control system for a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine provided with a turbocharger having a compressor wheel for pressurizing intake air of the engine and a turbine wheel connected with the compressor wheel and rotationally driven by kinetic energy of exhaust gases discharged from the engine, exhaust gas flow rate changing means for changing a flow rate of exhaust gases injected to the turbine wheel, an exhaust gas recirculation passage for recirculating the exhaust gases to an intake pipe of the engine, and an exhaust gas recirculation control valve disposed in the exhaust gas recirculation passage, the control system comprising:

exhaust pressure detecting means for detecting an exhaust pressure in an exhaust pipe of the engine;

intake pipe gas parameter obtaining means for obtaining a value of an intake pipe gas parameter indicating a state of gases in the intake pipe;

first target value calculating means for calculating a target value of the exhaust pressure;

second target value calculating means for calculating a target value of the intake pipe gas parameter; and gas control means for calculating a control amount of the exhaust gas flow rate changing means and an opening control amount of the exhaust gas recirculation control valve using a model predictive control, so that values of the detected exhaust pressure and the intake pipe gas parameter, respectively, coincide with the target values of the exhaust pressure and the intake pipe gas parameter.

2. The control system according to claim 1, wherein the exhaust pressure is a pressure on an upstream side of the turbine wheel in the exhaust pipe, and the intake pipe gas parameter is a partial pressure of one of fresh air and recirculated exhaust gases on a downstream side of the compressor wheel in the intake pipe, or a flow rate of one of fresh air and the recirculated exhaust gases flowing in the intake pipe.

3. The control system according to claim 1, wherein the exhaust pressure is a pressure on an upstream side of the turbine wheel in the exhaust pipe, and the intake pipe gas parameter is a partial pressure of one of oxygen and inert gases on a downstream side of the compressor wheel in the intake pipe, or a flow rate of one of oxygen and inert gases flowing in the intake pipe.

4. The control system according to claim 1, further including boost pressure detecting means for detecting a boost pressure in the intake pipe, wherein the second target value calculating means includes steady state target value calculating means for calculating a steady state target value corresponding to a steady state of the engine according to an operating condition of the engine, and modifying means for modifying the steady state target value according to the detected boost pressure to calculate the target value of the intake pipe gas parameter.

5. The control system according to claim 1, further including boost pressure detecting means for detecting a boost pressure in the intake pipe and intake air flow rate detecting means for detecting a flow rate of fresh air flowing in the intake pipe, wherein the first target value calculating means includes target power value calculating means for calculating a target power value of the compressor wheel according to a target boost pressure and a target fresh air flow rate calculated according to an operating condition of the engine, estimated power value calculating means for calculating an estimated power value of the compressor wheel according to the detected boost pressure and the detected fresh air flow rate, and feedback calculating means for calculating the target value of the exhaust pressure, so that the estimated power value coincides with the target power value.

6. The control system according to claim 1, wherein a controlled object model used in the model predictive control is defined using, as control inputs, a mass flow rate of gases passing through the exhaust gas flow rate changing means, and a mass flow rate of gases passing through the exhaust gas recirculation control valve.

7. A control system for an internal combustion engine provided with a turbocharger having a compressor wheel for pressurizing intake air of the engine and a turbine wheel connected with the compressor wheel and rotationally driven by kinetic energy of exhaust gases discharged from the engine, exhaust gas flow rate changing means for changing a flow rate of exhaust gases injected to the turbine wheel, an exhaust gas recirculation passage for recirculating the exhaust gases to an intake pipe of the engine, an exhaust gas recirculation control valve disposed in the exhaust gas recirculation passage, and a throttle valve disposed in the intake pipe, the control system comprising:
- exhaust pressure detecting means for detecting an exhaust pressure in an exhaust pipe of the engine;
- intake pipe gas parameter obtaining means for obtaining values of intake pipe gas parameters indicating a state of gases in the intake pipe;
- first target value calculating means for calculating a target value of the exhaust pressure;
- second target value calculating means for calculating target values of the intake pipe gas parameters; and
- gas control means for calculating a control amount of the exhaust gas flow rate changing means, an opening control amount of the exhaust gas recirculation control valve, and an opening control amount of the throttle valve using a model predictive control, so that values of the detected exhaust pressure and the intake pipe gas parameters, respectively, coincide with the target values of the exhaust pressure and the intake pipe gas parameters.

8. The control system according to claim 7, wherein the exhaust pressure is a pressure on an upstream side of the turbine wheel in the exhaust pipe, and the intake pipe gas parameters are any two of a partial pressure of fresh air on a downstream side of the throttle valve in the intake pipe, a partial pressure of the recirculated exhaust gases on the downstream side of the throttle valve in the intake pipe, and a sum of the partial pressures of the fresh air and the recirculated exhaust gases, or any two of a flow rate of fresh air flowing in the intake pipe, a flow rate of recirculated exhaust gases flowing in the intake pipe, and a sum of flow rates of fresh air and recirculated exhaust gases.

9. The control system according to claim 7, wherein the exhaust pressure is a pressure on an upstream side of the turbine wheel in the exhaust pipe, and the intake pipe gas parameters are any two of a partial pressure of oxygen on a downstream side of the throttle valve in the intake pipe, a partial pressure of inert gases on the downstream side of the throttle valve in the intake pipe, and a sum of partial pressures of oxygen and inert gases, or any two of a flow rate of the oxygen flowing in the intake pipe, a flow rate of the inert gases flowing in the intake pipe, and a sum of the flow rates of the oxygen and the inert gases.

10. The control system according to claim 7, further including boost pressure detecting means for detecting a boost pressure in the intake pipe,
wherein the second target value calculating means includes a steady state target value calculating means for calculating a steady state target value corresponding to a steady state of the engine according to an operating condition of the engine, and modifying means for modifying the steady state target value according to the detected boost pressure to calculate the target values of the intake pipe gas parameters.

11. The control system according to claim 7, wherein a controlled object model used in the model predictive control is defined using, as control inputs, a mass flow rate of gases passing through the exhaust gas flow rate changing means, a mass flow rate of gases passing through the exhaust gas recirculation control valve, and a mass flow rate of fresh air passing through the throttle valve.

12. A control method for an internal combustion engine provided with a turbocharger having a compressor wheel for pressurizing intake air of the engine and a turbine wheel connected with the compressor wheel and rotationally driven by kinetic energy of exhaust gases from the engine, an exhaust gas flow rate changing device for changing a flow rate of exhaust gases injected to the turbine wheel, an exhaust gas recirculation passage for recirculating the exhaust gases to an intake pipe of the engine, and an exhaust gas recirculation control valve disposed in the exhaust gas recirculation passage, the control method comprising the steps of:
a) detecting an exhaust pressure in an exhaust pipe of the engine;
b) obtaining a value of an intake pipe gas parameter indicating a state of gases in the intake pipe;
c) calculating a target value of the exhaust pressure;
d) calculating a target value of the intake pipe gas parameter; and
e) calculating a control amount of the exhaust gas flow rate changing device and an opening control amount of the exhaust gas recirculation control valve using a model predictive control, so that values of the detected exhaust pressure and the intake pipe gas parameter, respectively, coincide with the target values of the exhaust pressure and the intake pipe gas parameter.

13. The control method according to claim 12, wherein the exhaust pressure is a pressure on an upstream side of the turbine wheel in the exhaust pipe, and the intake pipe gas parameter is a partial pressure of one of fresh air and recirculated exhaust gases on a downstream side of the compressor wheel in the intake pipe, or a flow rate of one of fresh air and the recirculated exhaust gases flowing in the intake pipe.

14. The control method according to claim 12, wherein the exhaust pressure is a pressure on an upstream side of the turbine wheel in the exhaust pipe, and the intake pipe gas parameter is a partial pressure of oxygen and inert gases on a downstream side of the compressor wheel in the intake pipe, or a flow rate of one of oxygen and the inert gases flowing in the intake pipe.

15. The control method according to claim 12, further including the step of detecting a boost pressure in the intake pipe,
wherein the step d) includes the steps of:
i) calculating a steady state target value corresponding to a steady state of the engine according to an operating condition of the engine; and
ii) modifying the steady state target value according to the detected boost pressure to calculate the target value of the intake pipe gas parameter.

16. The control method according to claim 12, further including the steps of detecting a boost pressure in the intake pipe and detecting a flow rate of fresh air flowing in the intake pipe,
wherein the step c) includes the steps of:
i) calculating a target power value of the compressor wheel according to a target boost pressure and a target fresh air flow rate, which are calculated according to an operating condition of the engine;
ii) calculating an estimated power value of the compressor wheel according to the detected boost pressure and the detected fresh air flow rate; and
iii) calculating the target value of the exhaust pressure, so that the estimated power value coincides with the target power value.

17. The control method according to claim 12, wherein a controlled object model used in the model predictive control is defined using, as control inputs, a mass flow rate of gases passing through the exhaust gas flow rate changing means, and a mass flow rate of gases passing through the exhaust gas recirculation control valve.

18. A control method for an internal combustion engine provided with a turbocharger having a compressor wheel for pressurizing intake air of the engine and a turbine wheel connected with the compressor wheel and rotationally driven by kinetic energy of exhaust gases from the engine, an exhaust gas flow rate changing device for changing a flow rate of exhaust gases injected to the turbine wheel, an exhaust gas recirculation passage for recirculating the exhaust gases to an intake pipe of the engine, an exhaust gas recirculation control valve disposed in the exhaust gas recirculation passage, and a throttle valve disposed in the intake pipe, the control method comprising the steps of:

a) detecting an exhaust pressure in an exhaust pipe of the engine;

b) obtaining values of intake pipe gas parameters indicating a state of gases in the intake pipe;

c) calculating a target value of the exhaust pressure;

d) calculating target values of the intake pipe gas parameters; and e) calculating a control amount of the exhaust gas flow rate changing device, an opening control amount of the exhaust gas recirculation control valve, and an opening control amount of the throttle valve using a model predictive control, so that values of the detected exhaust pressure and the intake pipe gas parameters, respectively, coincide with the target values of the exhaust pressure and the intake pipe gas parameters.

19. The control method according to claim 18, wherein the exhaust pressure is a pressure on an upstream side of the turbine wheel in the exhaust pipe, and the intake pipe gas parameters are any two of a partial pressure of fresh air on a downstream side of the throttle valve in the intake pipe, a partial pressure of recirculated exhaust gases on the downstream side of the throttle valve in the intake pipe, and a sum of the partial pressures of fresh air and the recirculated exhaust gases, or any two of a flow rate of the fresh air flowing in the intake pipe, a flow rate of the recirculated exhaust gases flowing in the intake pipe, and a sum of the flow rates of the fresh air and the recirculated exhaust gases.

20. The control method according to claim 18, wherein the exhaust pressure is a pressure on an upstream side of the turbine wheel in the exhaust pipe, and the intake pipe gas parameters are any two of a partial pressure of oxygen on a downstream side of the throttle valve in the intake pipe, a partial pressure of inert gases on the downstream side of the throttle valve in the intake pipe, and a sum of the partial pressures of the oxygen and the inert gases, or any two of a flow rate of the oxygen flowing in the intake pipe, a flow rate of the inert gases flowing in the intake pipe, and a sum of the flow rates of the oxygen and the inert gases.

21. The control method according to claim 18, further including the step of detecting a boost pressure in the intake pipe, wherein the step d) includes the steps of:

i) calculating a steady state target value corresponding to a steady state of the engine according to an operating condition of the engine; and ii) modifying the steady state target value according to the detected boost pressure to calculate the target values of the intake pipe gas parameters.

22. The control method according to claim 18, wherein a controlled object model used in the model predictive control is defined using, as control inputs, a mass flow rate of gases passing through the exhaust gas flow rate changing means, a mass flow rate of gases passing through the exhaust gas recirculation control valve, and a mass flow rate of fresh air passing through the throttle valve.

23. A computer program embodied on a computer-readable medium, for causing a computer to implement a control method for an internal combustion engine provided with a turbocharger having a compressor wheel for pressurizing intake air of the engine and a turbine wheel connected with the compressor wheel and rotationally driven by kinetic energy of exhaust gases from the engine, exhaust gas flow rate changing device for changing a flow rate of exhaust gases injected to the turbine wheel, an exhaust gas recirculation passage for recirculating the exhaust gases to an intake pipe of the engine, an exhaust gas recirculation control valve disposed in the exhaust gas recirculation passage, and a throttle valve disposed in the intake pipe, the control method comprising the steps of:

a) detecting an exhaust pressure in an exhaust pipe of the engine;

b) obtaining values of intake pipe gas parameters indicating a state of gases in the intake pipe;

c) calculating a target value of the exhaust pressure;

d) calculating target values of the intake pipe gas parameters; and e) calculating a control amount of the exhaust gas flow rate changing device, an opening control amount of the exhaust gas recirculation control valve, and an opening control amount of the throttle valve using a model predictive control, so that values of the detected exhaust pressure and the intake pipe gas parameters, respectively, coincide with the target values of the exhaust pressure and the intake pipe gas parameters.

24. The computer program according to claim 23, wherein the exhaust pressure is a pressure on an upstream side of the turbine wheel in the exhaust pipe, and the intake pipe gas parameters are any two of a partial pressure of fresh air on a downstream side of the throttle valve in the intake pipe, a partial pressure of the recirculated exhaust gases on the downstream side of the throttle valve in the intake pipe, and a sum of the partial pressures of the fresh air and the recirculated exhaust gases, or any two of a flow rate of the fresh air flowing in the intake pipe, a flow rate of the recirculated exhaust gases flowing in the intake pipe, and a sum of the flow rates of the fresh air and the recirculated exhaust gases.

25. The computer program according to claim 23, wherein the exhaust pressure is a pressure on an upstream side of the turbine wheel in the exhaust pipe, and the intake pipe gas parameters are any two of a partial pressure of oxygen on a downstream side of the throttle valve in the intake pipe, a partial pressure of inert gases on the downstream side of the throttle valve in the intake pipe, and a sum of the partial pressures of the oxygen and the inert gases, or any two of a flow rate of the oxygen flowing in the intake pipe, a flow rate of the inert gases flowing in the intake pipe, and a sum of the flow rates of the oxygen and the inert gases.

26. The computer program according to claim 23, wherein the control method further includes the step of detecting a boost pressure in the intake pipe, wherein the step d) includes the steps of:

i) calculating a steady state target value corresponding to a steady state of the engine according to an operating condition of the engine; and ii) modifying the steady state target value according to the detected boost pressure to calculate the target values of the intake pipe gas parameters.

27. A computer program embodied on a computer-readable medium, for causing a computer to implement a control method for an internal combustion engine provided with a turbocharger having a compressor wheel for pressurizing intake air of the engine and a turbine wheel connected with the compressor wheel and rotationally driven by kinetic energy of exhaust gases from the engine, an exhaust gas flow rate changing device for changing a flow rate of exhaust gases injected to the turbine wheel, an exhaust gas recirculation passage for recirculating the exhaust gases to an intake pipe of the engine, and an exhaust gas recirculation control valve disposed in the exhaust gas recirculation passage, the control method comprising the steps of:

a) detecting an exhaust pressure in an exhaust pipe of the engine;
b) obtaining a value of an intake pipe gas parameter indicating a state of gases in the intake pipe;
c) calculating a target value of the exhaust pressure;
d) calculating a target value of the intake pipe gas parameter; and
e) calculating a control amount of the exhaust gas flow rate changing device and an opening control amount of the exhaust gas recirculation control valve using a model predictive control, so that values of the detected exhaust pressure and the intake pipe gas parameter, respectively, coincide with the target values of the exhaust pressure and the intake pipe gas parameter.

28. The computer program according to claim 27, wherein the exhaust pressure is a pressure on an upstream side of the turbine wheel in the exhaust pipe, and the intake pipe gas parameter is a partial pressure of one of oxygen and inert gases on a downstream side of the compressor wheel in the intake pipe, or a flow rate of one of oxygen and the inert gases flowing in the intake pipe.

29. The computer program according to claim 27, wherein the control method further includes the step of detecting a boost pressure in the intake pipe,
   wherein the step d) includes the steps of:
   i) calculating a steady state target value corresponding to a steady state of the engine according to an operating condition of the engine; and
   ii) modifying the steady state target value according to the detected boost pressure to calculate the target value of the intake pipe gas parameter.

30. The computer program according to claim 27, wherein the control method further includes the steps of detecting a boost pressure in the intake pipe and detecting a flow rate of fresh air flowing in the intake pipe,
   wherein the step c) includes the steps of:
   i) calculating a target power value of the compressor wheel according to a target boost pressure and a target fresh air flow rate calculated according to an operating condition of the engine;
   ii) calculating an estimated power value of the compressor wheel according to the detected boost pressure and the detected fresh air flow rate; and
   iii) calculating the target value of the exhaust pressure, so that the estimated power value coincides with the target power value.

31. The computer program according to claim 27, wherein the exhaust pressure is a pressure on an upstream side of the turbine wheel in the exhaust pipe, and the intake pipe gas parameter is a partial pressure of one of fresh air and the recirculated exhaust gases on a downstream side of the compressor wheel in the intake pipe, or a flow rate of one of fresh air and the recirculated exhaust gases flowing in the intake pipe.

32. The computer program according to claim 31, wherein a controlled object model used in the model predictive control is defined using, as control inputs, a mass flow rate of gases passing through the exhaust gas flow rate changing means, and a mass flow rate of gases passing through the exhaust gas recirculation control valve.

33. The computer program according to claim 31, wherein a controlled object model used in the model predictive control is defined using, as control inputs, a mass flow rate of gases passing through the exhaust gas flow rate changing means, a mass flow rate of gases passing through the exhaust gas recirculation control valve, and a mass flow rate of fresh air passing through the throttle valve.

* * * * *